United States Patent
Kim

(10) Patent No.: US 12,497,723 B2
(45) Date of Patent: Dec. 16, 2025

(54) MOVING HANGER CONTROL ON BASIS OF MOVEMENT OF CLOTHING

(71) Applicant: LG ELECTRONICS INC., Seoul (KR)

(72) Inventor: Wonchul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 624 days.

(21) Appl. No.: 17/785,691

(22) PCT Filed: May 29, 2020

(86) PCT No.: PCT/KR2020/006994
§ 371 (c)(1),
(2) Date: Jun. 15, 2022

(87) PCT Pub. No.: WO2021/132818
PCT Pub. Date: Jul. 1, 2021

(65) Prior Publication Data
US 2023/0063375 A1    Mar. 2, 2023

(30) Foreign Application Priority Data
Dec. 24, 2019    (KR) .................. 10-2019-0173893

(51) Int. Cl.
*D06F 34/28*        (2020.01)
*D06F 33/30*        (2020.01)
(Continued)

(52) U.S. Cl.
CPC .............. *D06F 34/28* (2020.02); *D06F 33/30* (2020.02); *D06F 34/05* (2020.02); *D06F 34/20* (2020.02);
(Continued)

(58) Field of Classification Search
None
See application file for complete search history.

(56) References Cited

U.S. PATENT DOCUMENTS

| | | |
|---|---|---|
| 2005/0166965 A1 | 8/2005 | Minnick |
| 2007/0186594 A1* | 8/2007 | Kim .................. D06F 34/05 68/12.01 |

(Continued)

FOREIGN PATENT DOCUMENTS

| | | |
|---|---|---|
| CN | 101328659 | 12/2008 |
| CN | 106884278 | 6/2017 |

(Continued)

OTHER PUBLICATIONS

Office Action in Korean Appln. No. 10-2019-0173893, mailed on May 1, 2024, 9 pages (with English translation).

(Continued)

*Primary Examiner* — Omair Chaudhri
(74) *Attorney, Agent, or Firm* — Fish & Richardson P.C.

(57) ABSTRACT

A method and device of controlling a moving hanger based on a movement of clothing are disclosed. A method of controlling a clothing styler includes determining a second moving pattern based on a dust amount in a processing chamber and movement information of clothes collected while a moving hanger operates in a first moving pattern, and controlling the moving hanger based on the determined second moving pattern. The controlling method can be associated with an artificial intelligence module, an unmanned aerial vehicle (UAV), a robot, an augmented reality (AR) device, a virtual reality (VR) device, devices related to 5G services, and the like.

11 Claims, 11 Drawing Sheets

(51) Int. Cl.

| | | |
|---|---|---|
| *D06F 34/05* | (2020.01) | |
| *D06F 34/20* | (2020.01) | |
| *D06F 34/26* | (2020.01) | |
| *D06F 58/12* | (2006.01) | |
| *D06F 58/44* | (2020.01) | |
| *D06F 71/32* | (2006.01) | |
| *D06F 73/02* | (2006.01) | |
| *D06F 103/02* | (2020.01) | |
| *D06F 103/28* | (2020.01) | |
| *D06F 103/64* | (2020.01) | |
| *D06F 105/36* | (2020.01) | |
| *G06N 3/08* | (2023.01) | |
| *H04N 7/18* | (2006.01) | |

(52) U.S. Cl.
CPC .............. *D06F 34/26* (2020.02); *D06F 58/12* (2013.01); *D06F 58/44* (2020.02); *D06F 71/32* (2013.01); *D06F 73/02* (2013.01); *G06N 3/08* (2013.01); *H04N 7/18* (2013.01); *D06F 2103/02* (2020.02); *D06F 2103/28* (2020.02); *D06F 2103/64* (2020.02); *D06F 2105/36* (2020.02)

(56) References Cited

U.S. PATENT DOCUMENTS

| | | | | |
|---|---|---|---|---|
| 2016/0160423 | A1* | 6/2016 | Yoneda | G01N 33/18 68/12.02 |
| 2018/0165744 | A1* | 6/2018 | Bajovic | G06Q 30/0631 |
| 2018/0334767 | A1* | 11/2018 | Kim | H04N 23/00 |
| 2019/0174466 | A1* | 6/2019 | Zhang | H04L 5/0057 |
| 2019/0302091 | A1* | 10/2019 | Kessler | G01N 33/367 |
| 2020/0014453 | A1* | 1/2020 | Takeda | H04B 7/088 |
| 2020/0040517 | A1* | 2/2020 | Kahya | D06F 75/14 |
| 2020/0056321 | A1* | 2/2020 | Jeong | D06F 58/36 |
| 2020/0392661 | A1* | 12/2020 | Hatfield | D06F 34/18 |
| 2021/0025097 | A1* | 1/2021 | Lee | D06F 34/18 |
| 2021/0214874 | A1* | 7/2021 | Iancu | G06V 10/803 |
| 2024/0254673 | A1* | 8/2024 | Kessler | C12Q 1/34 |

FOREIGN PATENT DOCUMENTS

| | | | | |
|---|---|---|---|---|
| CN | 107460702 | | 12/2017 | |
| CN | 110195344 | | 9/2019 | |
| DE | 102018005275 | | 12/2019 | |
| JP | 2016002238 | | 1/2016 | |
| JP | 2016-134944 | | 7/2016 | |
| JP | 2019-122535 | A | 7/2019 | |
| KR | 20170015670 | | 2/2017 | |
| KR | 20180103604 | A * | 9/2018 | |
| KR | 20190104949 | | 9/2019 | |
| KR | 102000450 | | 10/2019 | |
| WO | WO-2021011442 | A1 * | 1/2021 | .......... H04B 7/0695 |

OTHER PUBLICATIONS

Office Action in Chinese Appln. No. 202080090299.8, mailed on Mar. 25, 2023, 22 pages (with English translation).

PCT International Search Report in International Application No. PCT/KR2020/006994, dated Sep. 16, 2020, 4 pages (with English translation).

Extended European Search Report in European Appln. No. 20907904.5, mailed on Dec. 4, 2023, 11 pages.

* cited by examiner

MOVING HANGER CONTROL ON BASIS OF MOVEMENT OF CLOTHING

CROSS-REFERENCE TO RELATED APPLICATIONS

This application is a National Phase Application under 35 U.S.C. § 371 of International Application No. PCT/KR2020/006994, filed on May 29, 2020, which claims the benefit of Korean Application No. 10-2019-0173893, filed on Dec. 24, 2019. The contents of the aforementioned applications are hereby incorporated by reference in their entirety.

TECHNICAL FIELD

The present disclosure relates to a method and device of controlling a moving hanger based on a movement of clothing.

BACKGROUND ART

An artificial intelligence (AI) technology consists of machine learning (deep learning) and element techniques using the machine learning.

The machine learning is an algorithm technique that classifies/learns features of input data by itself. The element technique is a technique for mimicking the human brain's perception and decision capabilities using a machine learning algorithm such as deep learning, and consists of technical fields such as linguistic understanding, visual understanding, inference/prediction, knowledge representation, and motion control.

A clothing styler controls a moving hanger regardless of types and/or movement of clothing, thereby causing a damage of clothing or consuming unnecessarily large power.

DISCLOSURE

Technical Problem

An object of the present disclosure is to address the above-described and other needs and/or problems.

Another object of the present disclosure is to implement a method and device of controlling a moving hanger based on a movement of clothing capable of controlling a vibration pattern of the moving hanger based on the movement of clothing.

Another object of the present disclosure is to implement a method and device of controlling a moving hanger based on a movement of clothing capable of controlling the moving hanger so that a damage of clothing is minimized.

Another object of the present disclosure is to implement a method and device of controlling a moving hanger based on a movement of clothing capable of controlling the moving hanger so that unnecessary power consumption is minimized.

Technical Solution

In one aspect of the present disclosure, there is provided a method of controlling a clothing styler, the method comprising sensing a dust in a processing chamber through a sensor while a moving hanger operates in a first moving pattern; generating movement information of clothes provided in the processing chamber through a camera while the moving hanger operates in the first moving pattern; determining a second moving pattern based on the movement information of the clothes and a dust amount; and controlling the moving hanger based on the determined second moving pattern.

The movement information may include a movement distance of the clothes due to a vibration of the moving hanger.

The second moving pattern may be determined based on a learning model that is learned to generate an output for determining a vibration width or a vibration speed of the moving hanger using the movement information and the dust amount as an input.

The learning model may be implemented as an artificial neural network model based on reinforcement learning.

The artificial neural network model based on reinforcement learning may be a model that defines the movement information of the clothes and the dust amount as a state.

The artificial neural network model based on reinforcement learning may be a model that defines the vibration width or the vibration speed of the moving hanger as an action.

The artificial neural network model based on reinforcement learning may be a model that calculates a reward based on at least one of the movement information of the clothes or the dust amount.

The reward may be calculated to increase in proportion to the dust amount.

The reward may be calculated to increase in inverse proportion to the movement distance while increasing in proportion to the dust amount.

Determining the second moving pattern may comprise receiving, from a network, downlink control information (DCI) that is used to schedule a transmission of the movement information of the clothes and the dust amount. The movement information of the clothes and the dust amount may be transmitted to the network based on the DCI.

The method may further comprise performing an initial access procedure with the network based on a synchronization signal block (SSB). The movement information of the clothes and the dust amount may be transmitted to the network via a physical uplink shared channel (PUSCH), and the SSB and a dedicated demodulation reference signal (DM-RS) of the PUSCH may be QCLed with respect to quasi-co location (QCL) type D.

In another aspect of the present disclosure, there is provided a clothing styler comprising a sensor configured to sense a dust in a processing chamber while a moving hanger operates in a first moving pattern; a camera configured to take an image inside the processing chamber while the moving hanger operates in the first moving pattern; and a processor configured to generate movement information of clothes provided in the processing chamber based on the image, determine a second moving pattern based on the movement information of the clothes and a dust amount, and control the moving hanger based on the determined second moving pattern.

Advantageous Effects

Effects of a method and device of controlling a moving hanger based on a movement of clothing according to an embodiment of the present disclosure are described as follows.

The present disclosure can control a vibration pattern of a moving hanger based on a movement of clothing.

The present disclosure can control a moving hanger so that a damage of clothing is minimized.

The present disclosure can control a moving hanger so that unnecessary power consumption is minimized.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

MODE FOR INVENTION

Reference will now be made in detail to embodiments of the present disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

A. Example of Block Diagram of UE and 5G Network

Figure 1:
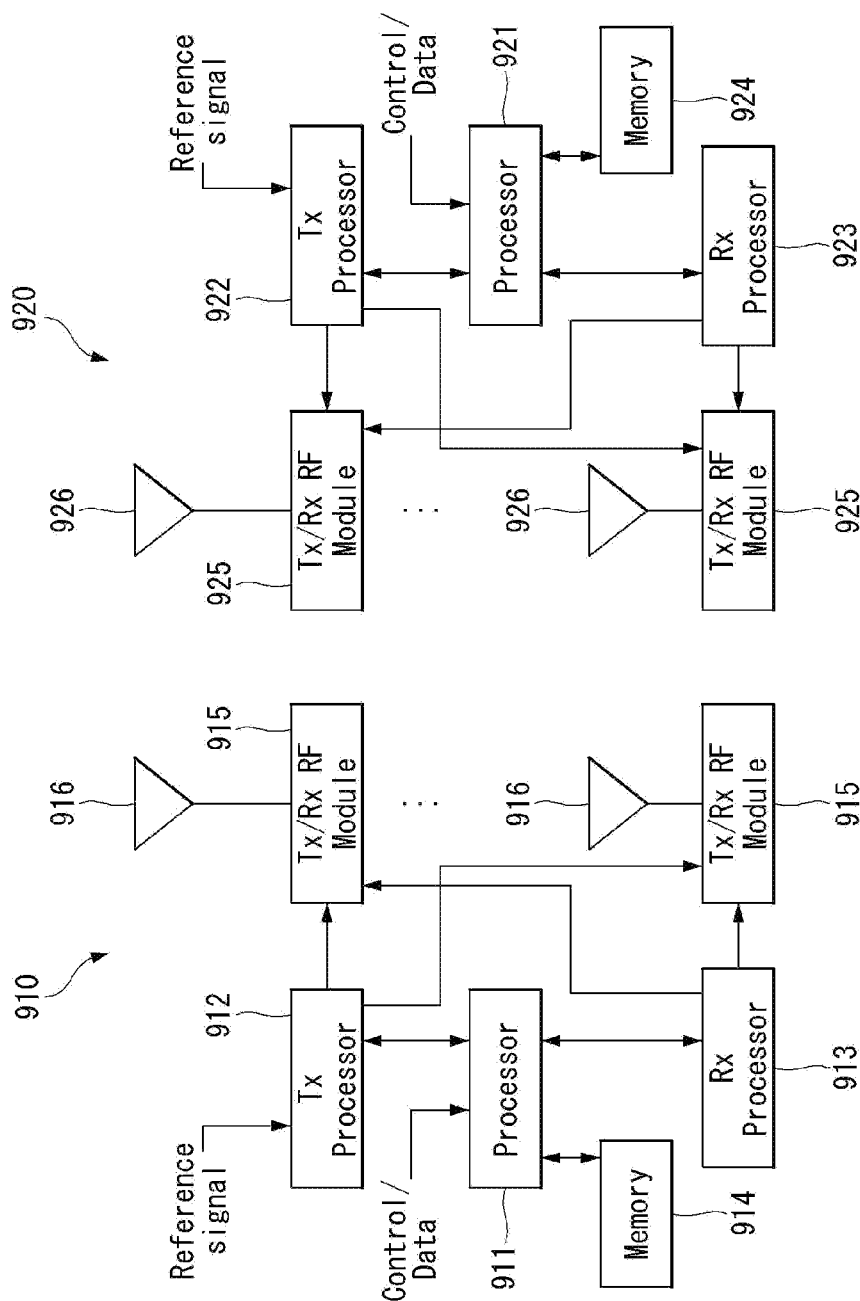
FIG. 1 illustrates a block diagram of configuration of a wireless communication system to which methods described in the present disclosure are applicable.

FIG. 1 illustrates a block diagram of configuration of a wireless communication system to which methods described in the present disclosure are applicable.

Referring to FIG. 1, a device (AI device) including an AI module is defined as a first communication device 910 (see FIG. 1), and a processor 911 can perform detailed autonomous operations.

A 5G network including another device (AI server) communicating with the AI device is defined as a second device 920 (see FIG. 1), and a processor 921 can perform detailed AI operations.

The 5G network may be represented as the first communication device and the AI device may be represented as the second communication device.

For example, the first communication device or the second communication device may be a base station (BS), a network node, a transmitter UE, a receiver UE, a wireless device, a wireless communication device, a vehicle, a vehicle with a self-driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service, or a device related to the fourth industrial revolution field.

For example, a terminal or user equipment (UE) may include a cellular phone, a smartphone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flight vehicle that flies by a radio control signal without a person being on the flight vehicle. For example, the VR device may include a device that implements an object or a background, etc. of a virtual world. For example, the AR device may include a device implemented by connecting an object or a background of a virtual world to an object or a background, etc. of a real world. For example, the MR device may include a device implemented by merging an object or a background of a virtual world with an object or a background, etc. of a real world. For example, the hologram device may include a device that records and reproduces stereoscopic information to implement a 360-degree stereoscopic image by utilizing a phenomenon of interference of light generated when two laser beams called holography meet. For example, the public safety device may include a video relay device or a video device that can be worn on the user's body. For example, the MTC device and the IoT device may be a device that does not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, alleviating, handling or preventing a disease. For example, the medical device may be a device used for the purpose of diagnosing, treating, alleviating or correcting an injury or a disorder. For example, the medical device may be a device used for the purpose of testing, substituting or modifying a structure or a function. For example, the medical device may be a device used for the purpose of controlling pregnancy. For example, the medical device may include a medical device, a surgical device, a (in vitro) diagnostic device, a hearing aid or a device for a surgical procedure, and the like. For example, the security device may be a device installed to prevent a possible danger and to maintain safety. For example, the security device may include a camera, CCTV, a recorder, or a black box, and the like. For example, the FinTech device may be a device capable of providing financial services, such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal via each antenna 926. The processor implements the above-described functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal via each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
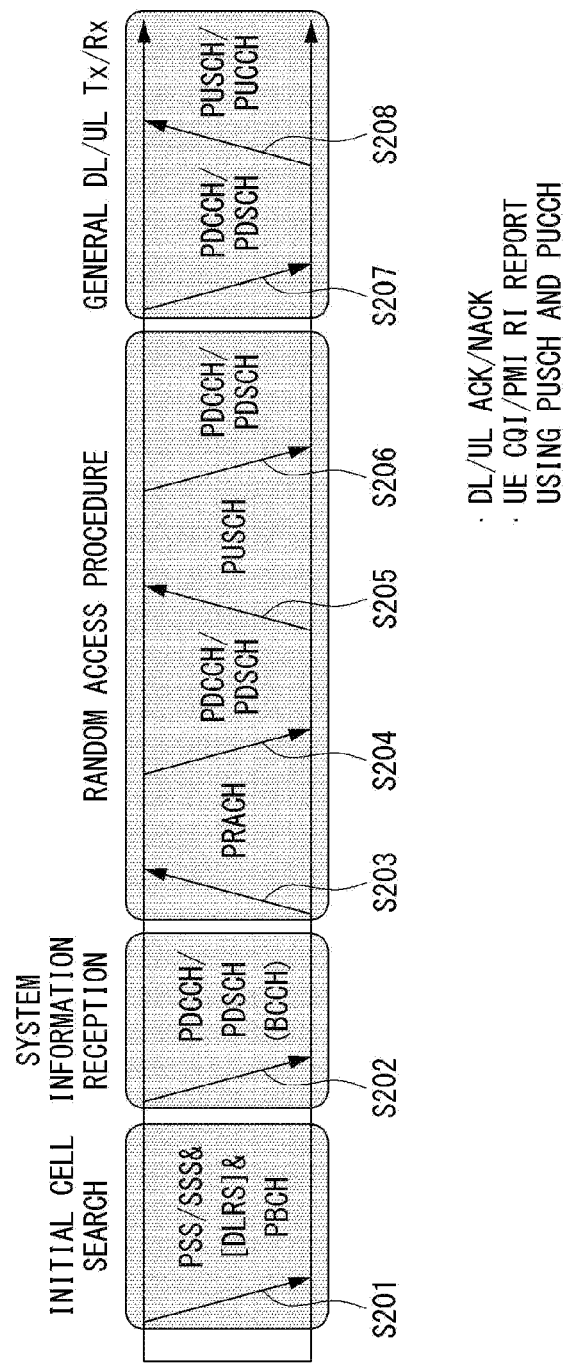
FIG. 2 illustrates an example of a signal transmission/reception method in a wireless communication system.

FIG. 2 illustrates an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE may acquire broadcast information in the cell by receiving a physical broadcast channel (PBCH) from the BS. Further, the UE may receive a downlink reference signal (DL RS) in the initial cell search step to check a downlink channel state. After initial cell search, the UE may acquire more detailed system information by receiving a physical downlink shared channel (PDSCH) according to a physical downlink control channel (PDCCH) and information included in the PDCCH (S202).

When the UE initially accesses the BS or has no radio resource for signal transmission, the UE may perform a random access procedure (RACH) for the BS (steps S203 to S206). To this end, the UE may transmit a specific sequence as a preamble via a physical random access channel (PRACH) (S203 and S205) and receive a random access response (RAR) message for the preamble via a PDCCH and the corresponding PDSCH (S204 and S206). For a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. In particular, the UE receives downlink control information (DCI) on the PDCCH. The UE monitors a set of PDCCH candidates in monitoring occasions configured to one or more control element sets (CORESETs) on a serving cell according to corresponding search space configurations. The set of PDCCH candidates to be monitored by the UE is defined in terms of search space sets, and the search space set may be a common search space set or a UE-specific search space set. The CORESET consists of a set of (physical) resource blocks with a duration of one to three OFDM symbols. A network may configure the UE to have a plurality of CORESETs. The UE monitors PDCCH candidates in one or more search space sets. Here, the monitoring means attempting to decode PDCCH candidate(s) in a search space. If the UE succeeds in decoding one of the PDCCH candidates in a search space, the UE determines that a PDCCH has been detected from the PDCCH candidates and performs PDSCH reception or PUSCH transmission based on DCI within the detected PDCCH. The PDCCH may be used to schedule DL transmissions on PDSCH and UL transmissions on PUSCH. Here, the DCI on the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system is additionally described with reference to FIG. 2.

The UE can perform cell search, system information acquisition, beam alignment for initial access, and DL measurement based on an SSB. The SSB is interchangeably used with a synchronization signal/physical broadcast channel (SS/PBCH) block.

The SSB includes a PSS, an SSS and a PBCH. The SSB consists of four consecutive OFDM symbols, and the PSS, the PBCH, the SSS/PBCH or the PBCH is transmitted per OFDM symbol. Each of the PSS and the SSS consists of one OFDM symbol and 127 subcarriers, and the PBCH consists of 3 OFDM symbols and 576 subcarriers.

The cell search refers to a process in which a UE acquires time/frequency synchronization of a cell and detects a cell identifier (ID) (e.g., physical layer cell ID (PCI)) of the cell. The PSS is used to detect a cell ID from a cell ID group, and the SSS is used to detect a cell ID group. The PBCH is used to detect an SSB (time) index and a half-frame.

There are 336 cell ID groups, and there are 3 cell IDs per cell ID group. A total of 1008 cell IDs are present. Information on a cell ID group to which a cell ID of a cell belongs is provided/acquired via an SSS of the cell, and information on the cell ID among 336 cell ID groups is provided/acquired via a PSS.

The SSB is periodically transmitted in accordance with SSB periodicity. A default SSB periodicity assumed by the UE during initial cell search is defined as 20 ms. After cell access, the SSB periodicity may be set to one of {5 ms, 10 ms, 20 ms, 40 ms, 80 ms, 160 ms} by a network (e.g., a BS).

Next, acquisition of system information (SI) is described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS via a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in the 5G communication system is additionally described with reference to FIG. 2.

A random access procedure is used for various purposes. For example, the random access procedure can be used for network initial access, handover, and UE-triggered UL data transmission. The UE can acquire UL synchronization and UL transmission resources through the random access procedure. The random access procedure is classified into a contention-based random access procedure and a contention-free random access procedure. A detailed procedure for the contention-based random access procedure is as follows.

The UE can transmit a random access preamble via PRACH as Msg1 of a random access procedure in UL. Random access preamble sequences with two different lengths are supported. Long sequence length 839 is applied to subcarrier spacings of 1.25 kHz and 5 kHz, and short sequence length 139 is applied to subcarrier spacings of 15 kHz, 30 kHz, 60 kHz and 120 kHz.

When a BS receives the random access preamble from the UE, the BS sends a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, i.e., Msg1. Presence or absence of random access information with respect to Msg1 transmitted by the UE can be determined depending on presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission based on most recent path loss and a power ramping counter.

The UE can perform UL transmission as Msg3 of the random access procedure on a physical uplink shared channel based on the random access response information. The Msg3 may include an RRC connection request and a UE ID. The network may transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure may be divided into (1) a DL BM procedure using an SSB or a CSI-RS and (2) a UL BM procedure using a sounding reference signal (SRS). In addition, each BM procedure may include Tx beam swiping for determining a Tx beam and Rx beam swiping for determining an Rx beam.

The DL BM procedure using an SSB is described.

Configuration for a beam report using an SSB is performed upon configuration of channel state information (CSI)/beam in RRC CONNECTED.

- A UE receives, from a BS, a CSI-ResourceConfig IE including CSI-SSB-ResourceSetList for SSB resources used for BM. The RRC parameter "csi-SSB-ResourceSetList" represents a list of SSB resources used for beam management and report in one resource set. An SSB resource set may be configured as {SSBx1, SSBx2, SSBx3, SSBx4, . . . }. An SSB index may be defined in the range of 0 to 63.
- The UE receives, from the BS, signals on SSB resources based on CSI-SSB-ResourceSetList.
- When CSI-RS reportConfig related to a report for SSBRI and reference signal received power (RSRP) is configured, the UE reports the best SSBRI and RSRP corresponding to this to the BS. For example, when reportQuantity of the CSI-RS reportConfig IE is configured to 'ssb-Index-RSRP', the UE reports the best SSBRI and RSRP corresponding to this to the BS.

When CSI-RS resource is configured to the same OFDM symbol(s) as SSB and 'QCL-TypeD' is applicable, the UE may assume that the CSI-RS and the SSB are quasi co-located (QCL) from the viewpoint of 'QCL-TypeD'. Here, 'QCL-TypeD' may mean that antenna ports are quasi co-located from the viewpoint of a spatial Rx parameter. When the UE receives signals of a plurality of DL antenna ports with a QCL-TypeD relationship, the same Rx beam can be applied.

Next, a DL BM procedure using a CSI-RS is described.

An Rx beam determination (or refinement) procedure of the UE and a Tx beam swiping procedure of the BS using a CSI-RS are sequentially described. A repetition parameter is set to 'ON' in the Rx beam determination procedure of the UE, and is set to 'OFF' in the Tx beam swiping procedure of the BS.

First, the Rx beam determination procedure of the UE is described.

- The UE receives, from the BS, an NZP CSI-RS resource set IE including an RRC parameter for 'repetition' via RRC signaling. The RRC parameter 'repetition' is set to 'ON'.
- The UE repeatedly receives signals on resource(s) in a CSI-RS resource set, in which the RRC parameter 'repetition' is set to 'ON', in different OFDM symbols through the same Tx beam (or DL spatial domain transmission filter) of the BS.

The UE determines its RX beam.

The UE skips a CSI report. That is, the UE may skip a CSI report when the RRC parameter 'repetition' is set to 'ON'.

Next, the Tx beam determination procedure of the BS is described.

The UE receives, from the BS, an NZP CSI-RS resource set IE including an RRC parameter for 'repetition' via RRC signaling. The RRC parameter 'repetition' is set to 'OFF' and is related to the Tx beam swiping procedure of the BS.

The UE receives signals on resources in a CSI-RS resource set, in which the RRC parameter 'repetition' is set to 'OFF', in different Tx beams (DL spatial domain transmission filter) of the BS.

The UE selects (or determines) a best beam.

The UE reports an ID (e.g., CRI) of the selected beam and related quality information (e.g., RSRP) to the BS. That is, when a CSI-RS is transmitted for the BM, the UE reports a CRI and RSRP with respect thereto to the BS.

Next, the UL BM procedure using an SRS is described.

The UE receives, from the BS, RRC signaling (e.g., SRS-Config IE) including a (RRC parameter) purpose parameter configured to 'beam management". The SRS-Config IE is used to configure SRS transmission. The SRS-Config IE includes a list of SRS-Resources and a list of SRS-ResourceSets. Each SRS resource set refers to a set of SRS-resources.

The UE determines Tx beamforming for SRS resources to be transmitted based on SRS-SpatialRelation Info included in the SRS-Config IE. SRS-SpatialRelation Info is configured per SRS resource and represents whether the same beamforming as beamforming used for an SSB, a CSI-RS or an SRS is applied per each SRS resource.

When SRS-SpatialRelationInfo is configured for SRS resources, the same beamforming as beamforming used for the SSB, CSI-RS or SRS is applied and transmitted. However, when SRS-SpatialRelationInfo is not configured for SRS resources, the UE randomly determines Tx beamforming and transmits an SRS through the determined Tx beamforming.

Next, a beam failure recovery (BFR) procedure is described.

In a beamformed system, radio link failure (RLF) may frequently occur due to rotation, movement or beamforming blockage of the UE. Thus, BFR is supported in NR to prevent frequent occurrence of RLF. The BFR is similar to a radio link failure recovery procedure and may be supported when the UE knows new candidate beam(s). For beam failure detection, the BS configures beam failure detection reference signals to the UE, and the UE declares beam failure when the number of beam failure indications from the physical layer of the UE reaches a threshold configured via RRC signaling within a period configured via RRC signaling of the BS. After the beam failure detection, the UE triggers beam failure recovery by initiating a random access procedure on PCell and performs the beam failure recovery by selecting a suitable beam (when the BS provides dedicated random access resources for certain beams, these are prioritized by the UE). The completion of the random access procedure is regarded as completion of beam failure recovery.

D. Ultra-Reliable and Low Latency Communication (URLLC)

URLLC transmission defined in NR may refer to (1) a relatively low traffic size, (2) a relatively low arrival rate, (3) extremely low latency requirements (e.g., 0.5 ms and 1 ms), (4) relatively short transmission duration (e.g., 2 OFDM symbols), (5) urgent services/messages, etc. In UL, transmission of traffic of a specific type (e.g., URLLC) needs to be multiplexed with another transmission (e.g., eMBB) scheduled in advance in order to satisfy more stringent latency requirements. In this regard, a method is provided, which provides information indicating preemption of specific resources to the pre-scheduled UE and allows a URLLC UE to use the corresponding resources for UL transmission.

NR supports dynamic resource sharing between eMBB and URLLC. eMBB and URLLC services may be scheduled on non-overlapping time/frequency resources, and URLLC transmission may occur in resources scheduled for ongoing eMBB traffic. An eMBB UE may not ascertain whether PDSCH transmission of the corresponding UE has been partially punctured, and the UE may not decode a PDSCH due to corrupted coded bits. In view of this, NR provides a preemption indication. The preemption indication may also be referred to as an interrupted transmission indication.

With regard to the preemption indication, the UE receives DownlinkPreemption IE via RRC signaling from the BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of locations for fields in DCI format 2_1 according to a set of serving cells and positionInDCI by INT-ConfigurationPerServing Cell including a set of serving cell indexes provided by serving-CellID, is configured with an information payload size for DCI format 2_1 by dci-Payloadsize, and is configured with indication granularity of time-frequency resources by time-FrequencySect.

The UE receives, from the BS, DCI format 2_1 based on the DownlinkPreemption IE.

If the UE detects DCI format 2_1 for a serving cell in a configured set of serving cells, the UE may assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in time-frequency resources indicated by preemption is not DL transmission scheduled to the UE, and decodes data based on signals received in the remaining resource region.

E. Massive MTC (mMTC)

Massive machine type communication (mMTC) is one of 5G scenarios for supporting a hyper-connection service that simultaneously communicate with a large number of UEs. In this environment, a UE intermittently performs communication with a very low speed and mobility. Thus, a main goal of mMTC is operating the UE for a long time at a low cost. In regard to mMTC technology, 3GPP deals with MTC and narrowband (NB)-IoT.

The mMTC technology has features such as repetitive transmission, frequency hopping, retuning, and a guard period of a PDCCH, a PUCCH, a physical downlink shared channel (PDSCH), a PUSCH, etc.

That is, PUSCH (or PUCCH (particularly, long PUCCH) or a PRACH) including specific information and PDSCH (or PDCCH) including a response to the specific information are repeatedly transmitted. The repetitive transmission is performed through frequency hopping. For the repetitive transmission, (RF) retuning from a first frequency resource to a second frequency resource is performed in the guard period, and the specific information and the response to the specific information may be transmitted/received through a narrowband (e.g., 6 resource blocks (RBs) or 1 RB).

F. AI Basic Operation Using 5G Communication

Figure 3:
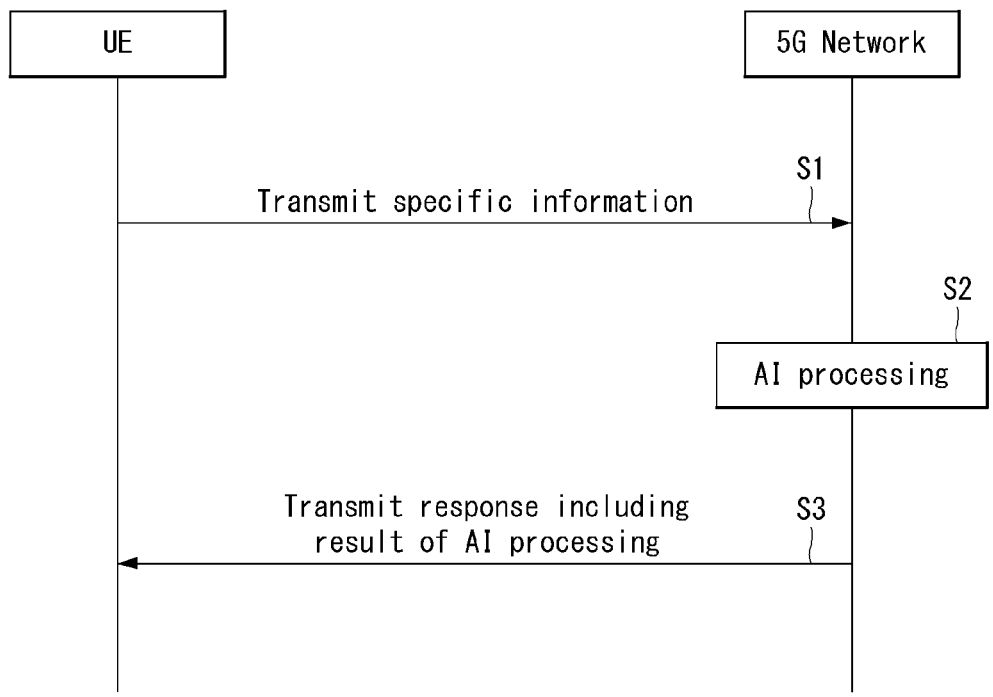
FIG. 3 illustrates an example of a basic operation of a user equipment (UE) and a 5G network in a 5G communication system.

FIG. 3 illustrates an example of a basic operation of a user equipment (UE) and a 5G network in a 5G communication system.

The UE transmits specific information to the 5G network, in S1. The 5G network performs 5G processing on the specific information, S2. The 5G processing may include AI processing. The 5G network sends a response including a result of AI processing to the UE, in S3.

G. Applied Operation Between UE and 5G Network in 5G Communication System

An AI operation using 5G communication is described in more detail below with reference to FIGS. 1 and 2 and the wireless communication technology (BM procedure, URLLC, mMTC, etc.) described above.

First, a basic procedure of an applied operation, to which a method according to the present disclosure to be described later and eMBB of 5G communication are applied, is described.

As in steps S1 and S3 of FIG. 3, the UE performs an initial access procedure and a random access procedure with the 5G network prior to step S1 of FIG. 3, in order to transmit/receive signals, information, etc. to/from the 5G network.

More specifically, the UE performs an initial access procedure with the 5G network based on SSB, in order to acquire DL synchronization and system information. A beam management (BM) procedure and a beam failure recovery procedure may be added to the initial access procedure, and a quasi-co-location (QCL) relationship may be added in a process in which the UE receives a signal from the 5G network.

In addition, the UE performs a random access procedure with the 5G network for UL synchronization acquisition and/or UL transmission. The 5G network may transmit, to the UE, a UL grant for scheduling transmission of specific information. Thus, the UE transmits the specific information to the 5G network based on the UL grant. In addition, the 5G network transmits, to the UE, a DL grant for scheduling transmission of a result of 5G processing for the specific information. Thus, the 5G network may transmit, to the UE, a response including a result of AI processing based on the DL grant.

Next, a basic procedure of an applied operation, to which a method according to the present disclosure to be described later and URLLC of 5G communication are applied, is described.

As described above, after the UE performs the initial access procedure and/or the random access procedure with the 5G network, the UE may receive DownlinkPreemption IE from the 5G network. Then, the UE receives, from the 5G network, DCI format 2_1 including a preemption indication based on DownlinkPreemption IE. The UE does not perform (or expect or assume) reception of eMBB data in resources (PRBs and/or OFDM symbols) indicated by the preemption indication. Thereafter, when the UE needs to transmit specific information, the UE may receive a UL grant from the 5G network.

Next, a basic procedure of an applied operation, to which a method according to the present disclosure to be described later and mMTC of 5G communication are applied, is described.

Description will focus on parts in the steps of FIG. 3 which are changed according to application of mMTC.

In step S1 of FIG. 3, the UE receives a UL grant from the 5G network in order to transmit specific information to the 5G network. The UL grant may include information on the number of repetitions of transmission of the specific information, and the specific information may be repeatedly transmitted based on the information on the number of repetitions. That is, the UE transmits the specific information to the 5G network based on the UL grant. The repetitive transmission of the specific information may be performed through frequency hopping, the first transmission of the specific information may be performed in a first frequency resource, and the second transmission of the specific information may be performed in a second frequency resource. The specific information may be transmitted on a narrowband of 6 resource blocks (RBs) or 1 RB.

The 5G communication technology described above may be applied in combination with the methods according to the present disclosure to be described later, or may be supplemented to specify or clarify the technical features of methods described in the present disclosure.

Block Diagram of AI Device

Figure 4:
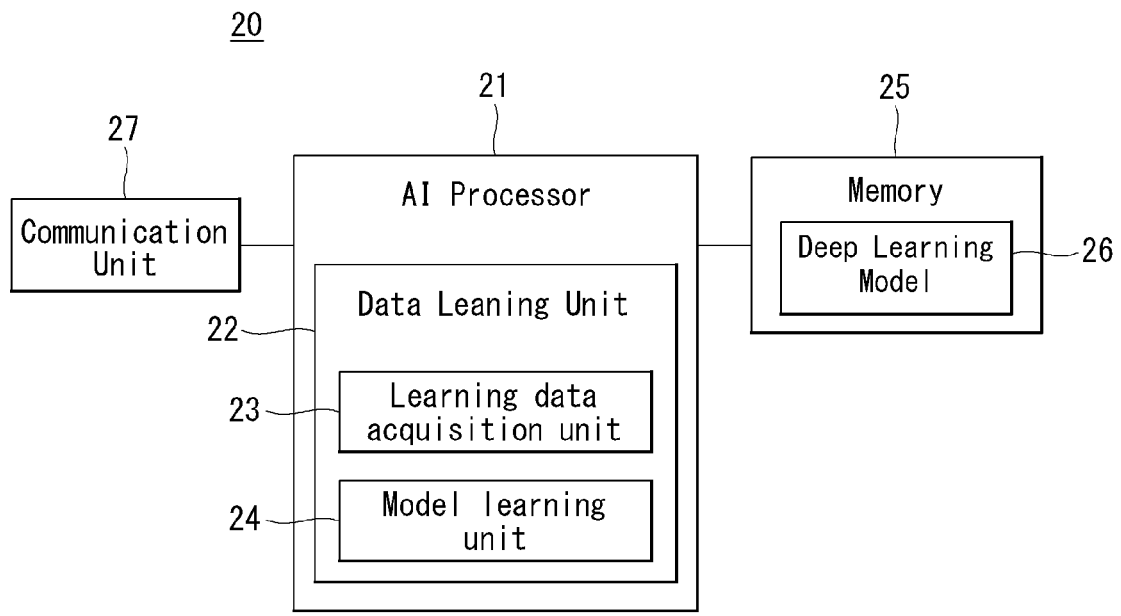
FIG. 4 is a block diagram of an AI device applied to various embodiments of the present disclosure.

FIG. 4 is a block diagram of an AI device according to an embodiment of the present disclosure.

An AI device 20 may include an electronic device including an AI module capable of performing AI processing, or a server including the AI module, and the like. The AI device 20 may be included as at least a partial configuration of a device 100 illustrated in FIG. 5 to perform at least a part of the AI processing.

Figure 5:
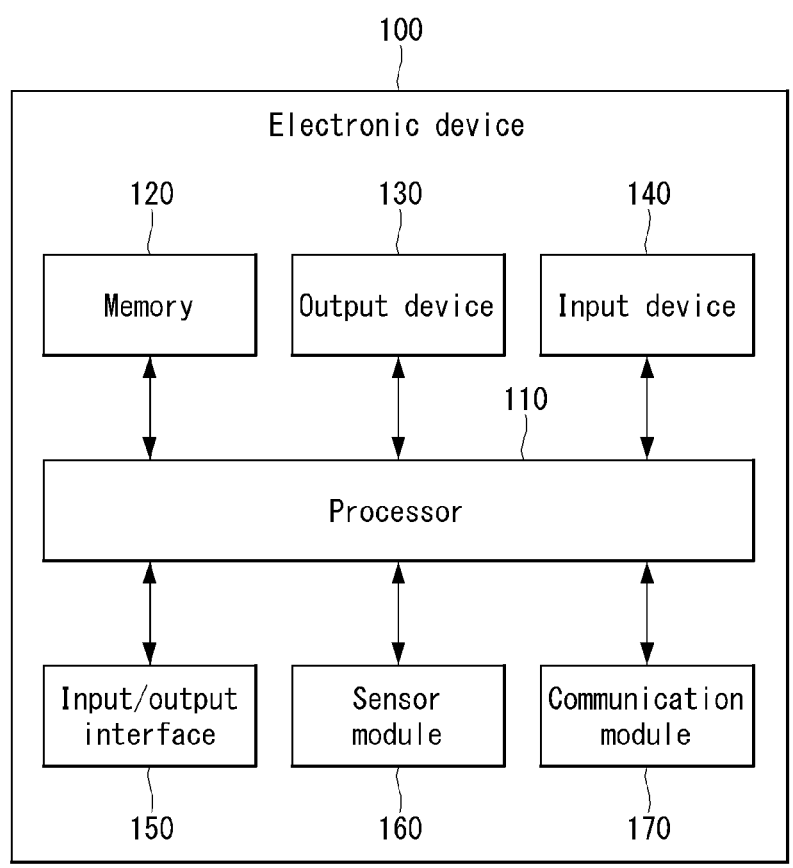
FIG. 5 illustrates a block diagram of an electronic device.

The AI processing may include all operations related to the control of the device 100 illustrated in FIG. 5. For example, an autonomous vehicle may perform the AI processing on sensing data or driver data to perform a processing/determination operation and a control signal generation operation. For example, the autonomous vehicle may also perform the autonomous driving control by performing AI processing on data obtained through an interaction with other electronic devices included in the autonomous vehicle.

The AI device 20 may include an AI processor 21, a memory 25, and/or a communication unit 27.

The AI device 20 is a computing device capable of learning a neural network and may be implemented as various electronic devices including a server, a desktop PC, a notebook PC, a tablet PC, and the like.

The AI processor 21 may learn a neural network using a program stored in the memory 25. In particular, the AI processor 21 may learn a neural network for recognizing device related data. The neural network for recognizing the device related data may be designed to emulate a human brain structure on a computer and may include a plurality of network nodes with weights that emulate neurons in a human neural network. The plurality of network nodes may send and receive data according to each connection relationship so that neurons emulate the synaptic activity of neurons sending and receiving signals through synapses. Herein, the neural network may include a deep learning model which has evolved from a neural network model. In the deep learning model, a plurality of network nodes may be arranged in different layers and may send and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

A processor performing the above-described functions may be a general purpose processor (e.g., CPU), but may be AI-dedicated processor (e.g., GPU) for AI learning.

The memory 25 may store various programs and data required for the operation of the AI device 20. The memory 25 may be implemented as a non-volatile memory, a volatile memory, a flash memory, a hard disk drive (HDD), or a solid state drive (SSD), etc. The memory 25 may be accessed by the AI processor 21, and the AI processor 21 may read/write/modify/delete/update data. Further, the memory 25 may store a neural network model (e.g., deep learning model 26) created by a learning algorithm for data classification/recognition according to an embodiment of the present disclosure.

The AI processor 21 may further include a data learning unit 22 for learning a neural network for data classification/recognition. The data learning unit 22 may learn criteria as to which learning data is used to determine the data classification/recognition and how to classify and recognize data using learning data. The data learning unit 22 may learn a deep learning model by acquiring learning data to be used in the learning and applying the acquired learning data to the deep learning model.

The data learning unit 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (e.g., CPU) or a graphic-dedicated processor (e.g., GPU) and mounted on the AI device 20. Further, the data learning unit 22 may be implemented as a software module. If the data learning unit 22 is implemented as the software module (or a program module including instruction), the software module may be stored in non-transitory computer readable media. In this case, at least one software module may be provided by an operating system (OS), or provided by an application.

The data learning unit 22 may include a learning data acquisition unit 23 and a model learning unit 24.

The learning data acquisition unit 23 may acquire learning data required for a neural network model for classifying and recognizing data. For example, the learning data acquisition unit 23 may acquire, as learning data, data and/or sample data of the vehicle to be input to a neural network model.

By using the acquired learning data, the model learning unit 24 may learn so that the neural network model has a criteria for determining how to classify predetermined data. In this instance, the model learning unit 24 may train the neural network model through supervised learning which uses at least a part of the learning data as the criteria for determination. Alternatively, the model learning unit 24 may train the neural network model through unsupervised learning which finds criteria for determination by allowing the neural network model to learn on its own using the learning data without supervision. Further, the model learning unit 24 may train the neural network model through reinforcement learning using feedback about whether a right decision is made on a situation by learning. Further, the model learning unit 24 may train the neural network model using a learning algorithm including error back-propagation or gradient descent.

If the neural network model is trained, the model learning unit 24 may store the trained neural network model in the memory. The model learning unit 24 may store the trained neural network model in a memory of a server connected to the AI device 20 over a wired or wireless network.

The data learning unit 22 may further include a learning data pre-processing unit (not shown) and a learning data selection unit (not shown), in order to improve a result of analysis of a recognition model or save resources or time required to create the recognition model.

The learning data pre-processing unit may pre-process acquired data so that the acquired data can be used in learning for determining the situation. For example, the learning data pre-processing unit may process acquired learning data into a predetermined format so that the model learning unit 24 can use the acquired learning data in learning for recognizing images.

Moreover, the learning data selection unit may select data required for learning among learning data acquired by the learning data acquisition unit 23 or learning data pre-processed by the pre-processing unit. The selected learning data may be provided to the model learning unit 24. For example, the learning data selection unit may detect a specific area in an image obtained by a camera of the vehicle to select only data for objects included in the specific area as learning data.

In addition, the data learning unit 22 may further include a model evaluation unit (not shown) for improving the result of analysis of the neural network model.

The model evaluation unit may input evaluation data to the neural network model and may allow the model learning unit 22 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

The communication unit 27 may send an external electronic device a result of the AI processing by the AI processor 21.

Although the AI device 20 illustrated in FIG. 4 is described to be functionally separated into the AI processor 21, the memory 25, the communication unit 27, etc., the above components may be integrated into one module and referred to as an AI module.

FIG. 5 illustrates a block diagram of an electronic device.

Referring to FIG. 5, an electronic device 100 may include at least one processor 110, a memory 120, an output device 130, an input device 140, an input/output interface 150, a sensor module 160, and a communication module 170.

The processor 110 may include at least one application processor (AP), at least one communication processor (CP), or at least one artificial intelligence (AI) processor. The application processor, the communication processor, or the AI processor may be respectively included in different integrated circuit (IC) packages, or may be included in one IC package.

The application processor may control a plurality of hardware or software components connected to the application processor by running an operating system or an application program, and perform various data processing/operation including multimedia data. For example, the application processor may be implemented as a system on chip (SoC). The processor 110 may further include a graphic processing unit (GPU) (not shown).

The communication processor may perform functions of managing a data link and converting a communication protocol in communication between the electronic device 100 and other electronic devices connected via a network. For example, the communication processor may be implemented as the SoC. The communication processor may perform at least a portion of a multimedia control function.

In addition, the communication processor may control data transmission and reception of the communication module 170. The communication processor may be implemented to be included as at least a part of the application processor.

The application processor or the communication processor may load, on a volatile memory, and process a command or data that is received from at least one of a non-volatile memory or other components connected to each of the application processor and the communication processor. Further, the application processor or the communication processor may store data, that is received from at least one of other components or generated by at least one of the other components, in the non-volatile memory.

The memory 120 may include an internal memory or an external memory. The internal memory may include at least one of a volatile memory (e.g., dynamic RAM (DRAM), static RAM (SRAM), synchronous dynamic RAM (SDRAM), etc.) or a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). According to an embodiment, the internal memory may take the form of a solid state drive (SSD). The external memory may include flash drive, for example, compact flash (CF), secure digital (SD), micro secure digital (Micro-SD), mini secure digital (Mini-SD), extreme digital (xD) or a memory stick, etc.

The output device 130 may include at least one of a display module or a speaker. The output device 130 may display various types of data including multimedia data, text data, voice data, etc. to a user or output the data as sound.

The input device 140 may include a touch panel, a digital pen sensor, a key, or an ultrasonic input device, etc. For example, the input device 140 may be the input/output interface 150. The touch panel may recognize a touch input in at least one of capacitive, pressure-sensitive, infrared, or ultrasonic types. In addition, the touch panel may further include a controller (not shown). In case of a capacitive touch panel, not only direct touch but also proximity recognition is possible. The touch panel may further include a tactile layer. In this case, the touch panel may provide a tactile reaction to the user.

The digital pen sensor may be implemented using the same or similar method to receiving a user's touch input or a separate recognition layer. The key may use a keypad or a touch key. The ultrasonic input device is a device that can confirm data by detecting a micro-sonic wave at a user equipment (UE) through a pen generating an ultrasonic signal, and is capable of wireless recognition. The electronic device 100 may also receive a user input from an external device (e.g., network, computer, or server) connected to the communication module 170 using the communication module 170.

The input device 140 may further include a camera module and a microphone. The camera module is a device capable of taking images and videos, and may include one or more image sensors, an image signal processor (ISP), or a flash LED. The microphone may receive a voice signal and convert it into an electrical signal.

The input/output interface 150 may transmit a command or data, that is input from the user through the input device or the output device, to the processor 110, the memory 120, the communication module 170, etc. through a bus (not shown). For example, the input/output interface 150 may provide the processor 110 with data for a user's touch input that is input through the touch panel. For example, the input/output interface 150 may output a command or data, that is received from the processor 110, the memory 120, the communication module 170, etc. through the bus, through the output device 130. For example, the input/output interface 150 may output voice data processed by the processor 110 to the user through the speaker.

The sensor module 160 may include at least one of a gesture sensor, a gyro sensor, an atmospheric pressure sensor, a magnetic sensor, an acceleration sensor, a grip sensor, a proximity sensor, an RGB (red, green, blue) sensor, a biometric sensor, a temperature/humidity sensor, an illuminance sensor, or an ultraviolet (UV) sensor. The sensor module 160 may measure physical quantity or sense an operating state of the electronic device 100 to convert measured or sensed information into electrical signals. Additionally or alternatively, the sensor module 160 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, a fingerprint sensor, or the like. The sensor module 160 may further include a control circuit for controlling at least one sensor included therein.

The communication module 170 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface or a modem, etc. for connecting the electronic device 100 to a network (e.g., Internet, LAN, WAN, telecommunication network, cellular network, satellite network, POTS or 5G network, etc.).

The RF module may be responsible for transmitting and receiving data, for example, transmitting and receiving an RF signal or a called electronic signal. For example, the RF module may include a transceiver, a power amp module (PAM), a frequency filter, or a low noise amplifier (LNA), etc. Further, the RF module may further include components, for example, conductors or lead wires, etc. for transmitting and receiving electromagnetic waves in a free space in wireless communication.

The electronic device 100 according to various embodiments of the present disclosure may include at least one of a TV, a refrigerator, an oven, a clothing styler, a robot cleaner, a drone, an air conditioner, an air cleaner, a PC, a speaker, a home CCTV, an electric light, a washing machine, and a smart plug. Since the components of the electronic device 100 illustrated in FIG. 5 are exemplified as components generally provided in an electronic device, the electronic device 100 according to the embodiment of the present disclosure is not limited to the above-described components, and the components may be omitted and/or added, if necessary or desired. The electronic device 100 may perform an artificial intelligence-based control operation by receiving a result of AI processing from the AI device illustrated in FIG. 4, or may perform the AI processing in an on-device manner by including an AI module in which the components of the AI device are integrated into one module.

The electronic device 100 applied to various embodiments of the present disclosure may be a clothing styler. In the present disclosure, the 'clothing styler' may be used interchangeably with a 'clothing management device'. Hereinafter, the present disclosure describes in detail a clothing management method using an AI-based clothing styler.

Figure 6:
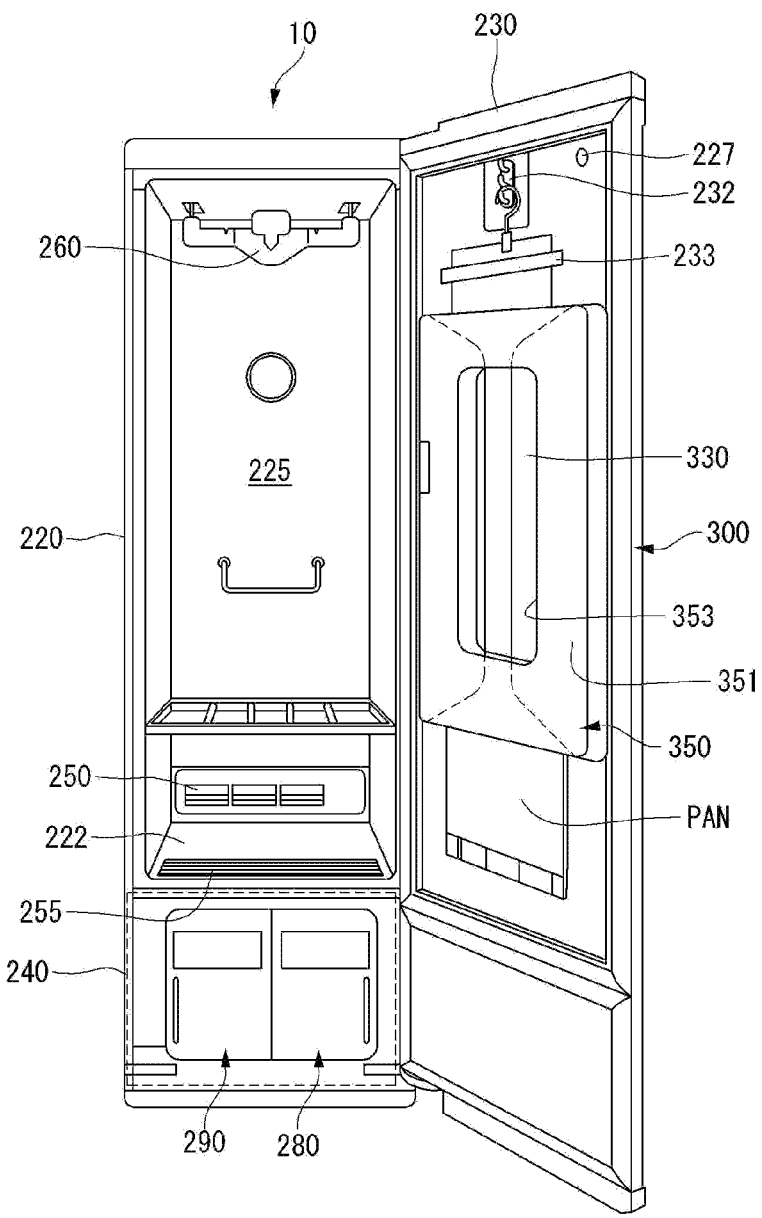
FIGS. 6 and 7 illustrate an appearance of a clothing styler applied to various embodiments of the present disclosure.
Figure 7:
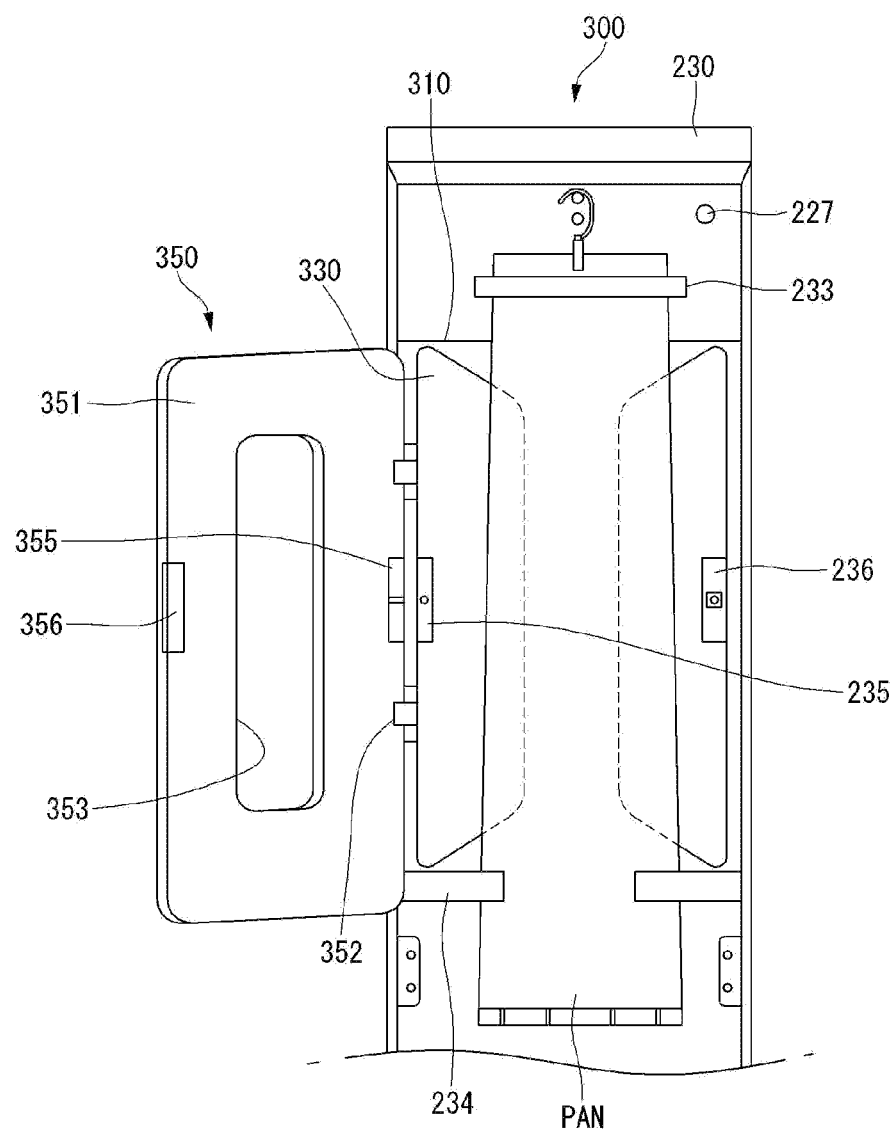

FIGS. 6 and 7 illustrate an appearance of a clothing styler applied to an embodiment of the present disclosure.

Referring to FIGS. 6 and 7, a clothing styler 10 according to an embodiment of the present disclosure includes a cabinet 220.

The cabinet 220 includes a processing chamber 225 that accommodates clothes and performs a process of removing wrinkles from the clothes and deodorizing the clothes through steam or air circulation, and a machine room 240 that is disposed below the processing chamber 225 and mounts a large number of components for clothes processing.

The cabinet 220 includes a partition plate 222 that partitions the processing chamber 225 and the machine room 240. The processing chamber 225 may be formed on the partition plate 222, and the machine room 240 may be formed below the partition plate 222.

The processing chamber 225 may be defined as a space formed by an inner wall of the cabinet 220. For example, the processing chamber 225 may be defined as a space formed by an upper wall, upper parts of left and right walls, and an upper part of a rear wall of the cabinet 220. The machine room 240 may be defined as a space formed by a lower wall, lower parts of the left and right walls, and a lower part of the rear wall of the cabinet 220.

A moving hanger 260 on which clothes hangers can be hung is provided inside the cabinet 220. The moving hanger 260 may be disposed at an upper part of the processing chamber 225. The moving hanger 260 may be configured such that it can move in a plurality of directions by a driving device such as a motor. For example, the plurality of directions may include a front-rear direction, an up-down direction, and a left-right direction. The 'hanger' and the 'moving hanger' may be used interchangeably with each other.

The clothing styler 10 further includes a discharge portion 250 that can discharge steam or heated air (warm air) into the processing chamber 225. For example, the discharge portion 250 may be formed at a portion where the rear wall of the cabinet 220 and a rear part of the partition plate 222 meet.

The clothing styler 10 further includes an inlet portion 255 that discharges air in the processing chamber 225, in particular, humidified air or air containing contaminant particles and odor particles after the clothes are processed in the processing chamber 225, to the machine room 240. The inlet portion 255 may be formed in a front part of the partition plate 222.

The clothing styler 10 may include a plurality of tanks 280 and 290 disposed in a front part of the machine room 240. The plurality of tanks 280 and 290 may include a water supply tank 280 for supplying water to a steam generator (not shown). Water in the water supply tank 280 may be supplied to the steam generator through a feed water pump (not shown). The steam generator may be provided in the machine room 240.

The plurality of tanks 280 and 290 may further include a drain tank 290 that collects and stores condensed water generated in the processing chamber 225 or condensed water generated in a heat pump (not shown). The condensed water generated in the heat pump may flow into the drain tank 290 through a drain pump (not shown). The heat pump may be provided in the machine room 240.

The water supply tank 280 and the drain tank 290 are exposed to a lower part of the clothing styler 10 when a door 230 is opened, and may be configured such that they are detachable by a user. The user may detach the water supply tank 280 from the clothing styler 10 to replenish water and may detach the drain tank 290 from the clothing styler 10 to discard water stored in the drain tank 290.

The clothing styler 10 further includes a door 230 capable of opening or closing the processing chamber 225. For example, the door 230 may be disposed in front of the cabinet 220 and rotatably coupled to the cabinet 220.

A pants wrinkle management device 300 for removing wrinkles of pants among clothes may be provided on a rear surface, i.e., an inner surface of the door 230. At an upper side of the pants wrinkle management device 300, a pants hanger 232 on which a clothes hanger 233 for holding pants can be hung is provided. The user may hang the pants on the clothes hanger 233 and then hang the clothes hanger 233 on the pants hanger 232.

The user may mount the pants on the pants wrinkle management device 300 and fix the pants flat. In a process of operating the clothing styler 10, steam or warm air is supplied to the pants wrinkle management device 300, and thus wrinkles of the pants can be removed and wrinkles in a desired direction can be obtained in the pants.

The pants wrinkle management device 300 includes a press plate 310 coupled to the rear surface of the door 230 and a press door 350 coupled to a front of the press plate 310. The press plate 310 or the press door 350 may be made of a metal or plastic material.

Based on FIG. 7, pants PAN hung on the pants hanger 232 may be placed in front of the press plate 310, and the press door 350 may be closed in front of the pants PAN. The pants PAN may be pressed between the press plate 310 and the press door 350, and the pants PAN may have wrinkles (desired wrinkles) in this process. That is, the pants PAN are mounted on the pants wrinkle management device 300 and can have an effect of ironing.

The press door 350 includes a door body 351 forming a through portion 353. The through portion 353 may be formed in a substantially central portion of the door body 351, and steam or warm air existing in the processing chamber 25 may act on the pants PAN mounted on the rear of the press door 350 through the through portion 353.

The press door 350 may be rotatably coupled to the door 230. More specifically, the press door 350 includes a hinge portion 352 coupled to the door 230. The hinge portion 352 may be provided on one side, for example, on the left side of the door body 351. In addition, a plurality of hinge portions 352 may be provided, and the plurality of hinge portions 352 may be arranged to be spaced apart from each other in the up-down direction on the left side of the door body 351.

The door body 351 includes latches 355 and 356 coupled to the door 230. The latches 355 and 356 include a first latch 355 provided at one side of the door body 351 and a second latch 356 provided at other side of the door body 351. For example, the first latch 355 may be provided at the left side of the door body 351, and the second latch 356 may be provided at the right side of the door body 351.

The first latch 355 may be disposed between the plurality of hinge portions 352 based on the up-down direction. A height of the first latch 355 may be the same as a height of the second latch 356.

The door 230 includes a first latch coupling part 236 coupled to the first latch 355 and a second latch coupling part 236 coupled to the second latch 356. As the latches 355 and 356 are coupled to the latch coupling portions 235 and 236, the press door 350 may not move during the operation of the clothing styler 10 and can easily press the pants PAN in the closed state.

The pants wrinkle management device 300 further includes a film 330 that is disposed between the press plate 310 and the press door 350 to press the pants PAN. The film 330 may be made of a flexible material.

However, the film 330 is configured to have a bending rigidity that is not easily bent by a pressure while having a relatively thin thickness, thereby providing a compressive force to the pants PAN.

Specifically, the film 330 may be made of a plastic material. For example, the film 330 may be made of polycarbonates, polypropylene, or polyethylene terephthalate (PET) material.

The film 330 may have a thickness of 0.5 to 1.0 mm and may be formed to be relatively thin. Since the film 330 is formed to be relatively thin, the user can easily manipulate the film 330. In addition, the occurrence of movement in a direction of generating wrinkles in the pants PAN on which the film 330 is mounted can be reduced by the pressing force transmitted from the press plate 310 and the press door 350.

The door 230 includes a clip 234 for supporting a lower part of the pants PAN. The clip 234 may be configured to press a front part of the pants PAN in a state in which the pants PAN are mounted, thereby preventing the pants PAN from swinging.

The film 330 may be positioned between both sides of the pants PAN, that is, between left and right portions into which the legs are inserted. For example, based on FIG. 7, the left portion of the pants PAN may be placed on a front surface of the press plate 310, and the film 330 may be in close contact with the front left portion of the pants PAN.

The right portion of the pants PAN may be positioned in front of the film 330, and the clip 234 may be fitted to a front lower side of the right portion of the pants PAN. That is, the right portion of the pants PAN may move to the rear side of the clip 234 and may be supported by the clip 234. The press door 350 may be positioned in front of the clip 234 and may press the pants PAN.

Through such a configuration, the pants wrinkle management device 300 can allow the pants PAN to have desired wrinkles and can remove the wrinkles of the pants PAN.

The clothing styler 10 according to an embodiment of the present disclosure may include a camera 227. The camera 227 may be provided in the cabinet 220 or the door 230 and may be configured to generate image information or images of clothes inside the cabinet 220 (more specifically, inside the processing chamber 225). For example, the camera 227 may be configured to take the hanging clothes inside the processing chamber 225 and generate image information. The camera 227 may include an image sensor and a lighting device. The camera 227 may be disposed on the upper rear surface of the door 230. This is because it is preferable to generate an image of the clothes from the top to the bottom since the clothes are hung on the moving hanger 260.

Figure 8:
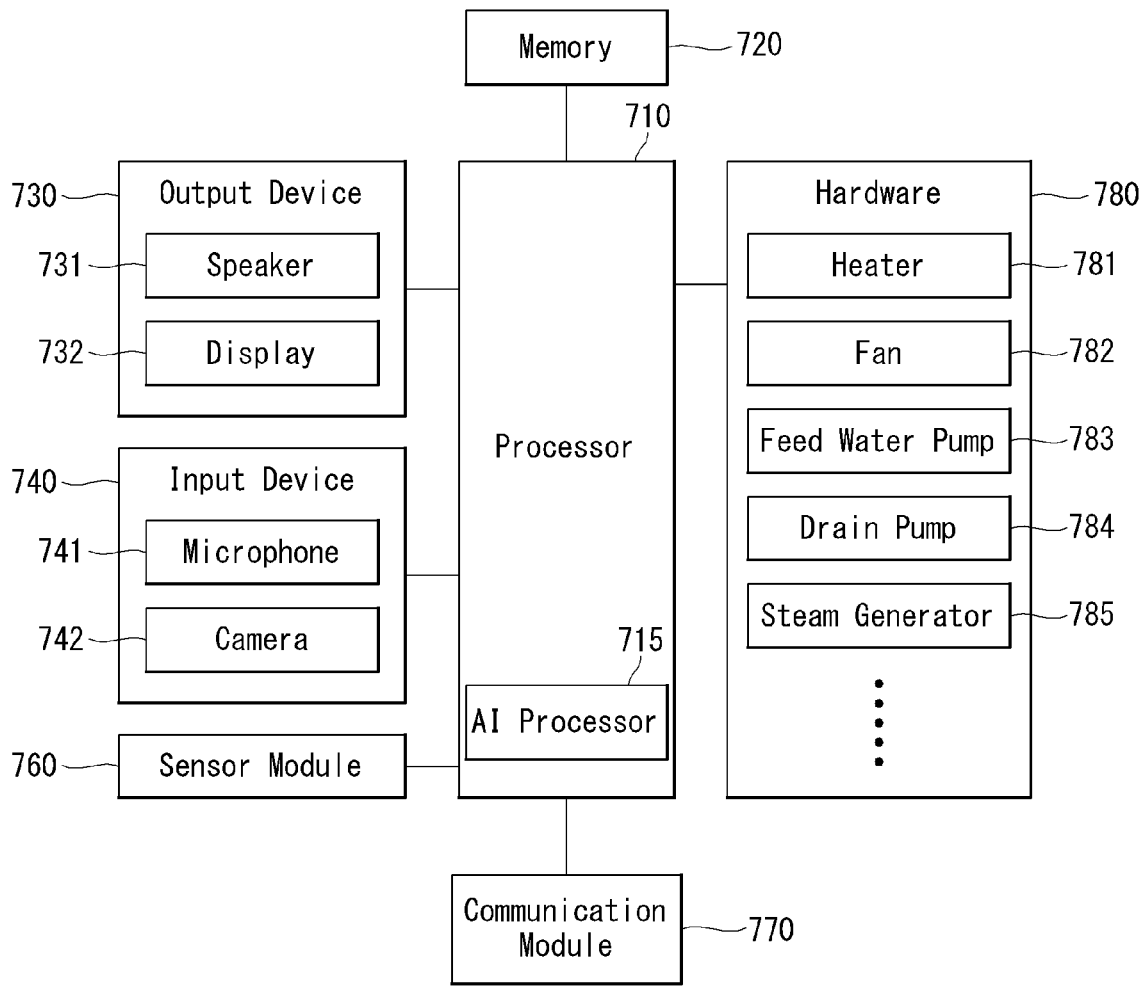
FIG. 8 is a block diagram of a clothing styler applied to various embodiments of the present disclosure.

FIG. 8 is a block diagram of a clothing styler applied to an embodiment of the present disclosure.

Referring to FIG. 8, the clothing styler 10 may include a processor 710, a memory 720, an output device 730, an input device 740, a sensor module 760, a communication module 770, and a hardware 780.

The processor 710 may store information supporting various functions of the clothing styler 10 in the memory 720. The memory 720 may store multiple application programs or applications running in the clothing styler 10, and information and instructions for the operation of the clothing styler 10. Some of the applications may be downloaded from an external server via wireless communication. The memory 720 may store information about one or more users who want to interact with a clothing processing device. The user information may include user identification information through voice recognition, user identification information through vision recognition, user identification information through biometric sensing, user identification information through menu input, etc., and is not limited thereto.

The memory 720 may include at least one type of storage medium among a flash memory type, a hard disk type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The clothing styler 10 may also operate in relation to a web storage that performs the storage function of the memory 720 over the Internet.

The output device 730 may include a speaker 731, a display 732, and the like, but is not limited thereto.

The speaker 731 may output an alert message such as a warning sound, an operation mode, an operation state, and an error state, information corresponding to a user's voice command, a processing result corresponding to the user's voice command, etc. through audio under the control of the processor 710. The speaker 731 may convert an electrical signal from the processor 710 into an audio signal and output the audio signal.

The display 732 may display an operation state of the clothing styler 10 under the control of the processor 710. The display 732 may include a control panel. The control panel may include at least one of a power setting unit for setting power on/off, a course setting unit for selecting various preset clothing management courses, a start/stop selection unit for selecting start/stop of operation based on a selected clothing management course, or a state display unit for displaying the operation state of the clothing styler 10.

The display 732 may also perform a function of the input device 740 receiving a predetermined control command so that the user can control the overall operation of the clothing styler 10, in addition to a function of displaying a variety of information. To this end, the display 732 may include a touch screen. For example, the display 732 may provide an output interface and an input interface between the clothing styler 10 and the user through the touch screen.

The input device 740 may include a microphone 741, a camera 742, and the like.

The microphone 741 may receive a user's voice spoken toward the clothing styler 10 under the control of the processor 710. The clothing styler 10 may include a plurality of microphones to more accurately receive the user's spoken voice. The plurality of microphones may be disposed to be spaced apart from each other at different positions and may process the received user's spoken voice as an electrical signal.

The camera 742 processes an image frame such as a still image or a moving picture obtained by the image sensor. The image frame processed by the camera 742 may be stored in the memory 720 or transmitted to an external device through the communication module 770. One or more cameras 742 may be disposed in the clothing styler 10. For example, an external camera of the one or more cameras 742 may take an external image of the clothing styler 10. For example, an internal camera of the one or more cameras 742 may be disposed to take at least one of hardware components such as the processing chamber 225, the moving hanger 260, and the inlet portion 255. As above, the images obtained by the camera 742 may be used in AI processing including vision recognition.

The sensor module 760 may include at least one of a dust sensor, a gesture sensor, a gyro sensor, a barometric pressure sensor, a magnetic sensor, an acceleration sensor, a grip sensor, a proximity sensor, an RGB (red, green, blue) sensor, a biometric sensor, a temperature/humidity sensor, an illuminance sensor, or an ultraviolet (UV) sensor. The sensor module 760 may measure physical quantity or sense an operating state of the electronic device 100 to convert measured or sensed information into electrical signals. Additionally or alternatively, the sensor module 760 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, a fingerprint sensor, or the like. The sensor module 760 may further include a control circuit for controlling at least one sensor included in the sensor module 760. The clothing styler may combine data sensed by at least two sensors of these sensors and variously use the combined data.

The communication module 770 may interwork with a network (e.g., 3G, 4G, LTE or 5G network) and provide a communication interface required to provide transmission/reception signals between the clothing styler 10, a user equipment (UE) and/or a server in the form of packet data. The communication module 770 may support a variety of internet of things (IoT), internet of everything (IoE), internet of small things (IoST), and the like, and may support machine to machine (M2M) communication, vehicle to everything (V2X) communication, device to device (D2D), and the like.

The hardware 780 may include a heater 781, a fan 782, a feed water pump 783, a drain pump 784, a steam generator 785, and the like. Depending on function and use of the clothing styler 10, some of the components described above may be omitted, or more components may be further included.

For example, the heater 781 may be used to dry clothes together with the fan 782. For example, when water in the water supply tank 280 is supplied to the steam generator 785, the steam generator 785 may generate steam by heating the water through the heater 781. To facilitate water replenishment, the water supply tank 280 may be detachably installed in the cabinet 220. The user may detach the water supply tank 280 and replenish water therein. The drain tank 290 may store condensed water generated in the processing chamber 225 or condensed water generated in a heat pump (not shown). The condensed water generated in the heat pump may flow to the drain tank 290 through the drain pump 784. When there is no drain tank 290, a separate drain pump 784 may be included.

Hereinafter, the present disclosure describes a method of controlling a clothing styler for effectively removing dust from clothes in a processing chamber of the clothing styler considering damage to clothes. Since a learning model used in an embodiment of the present disclosure can be updated by a reinforcement learning scheme, reinforcement learning is simply described with reference to FIG. 9.

Figure 9:
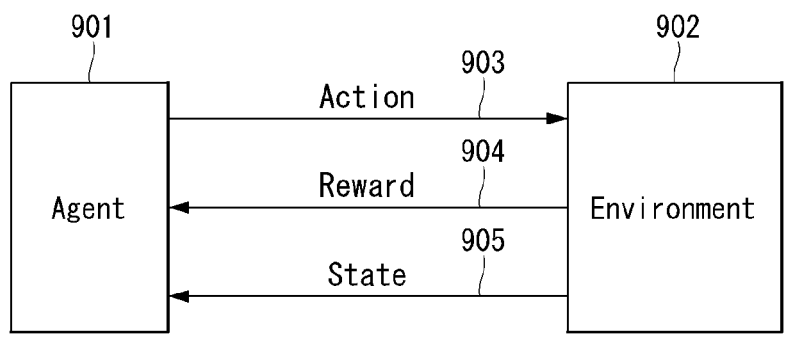
FIG. 9 illustrates an example of explaining single agent reinforcement learning.

FIG. 9 illustrates an example of explaining single agent reinforcement learning.

Referring to FIG. 9, reinforcement learning is a learning scheme consisting of three elements including an environment 902, an action 903, and a reward 904. The reinforcement learning has mainly carried out many studies on single agent. The reinforcement learning is based on a process of receiving the reward 904 by observing a change in the environment 902 with respect to the specific action 903 when an agent 901 takes the specific action 903. Since the agent 901 can check a result for the action 903 selected based on a size of the reward 904, the agent 901 learns a selection criteria of the action 903 for obtaining a best result in the provided environment 902. In the reinforcement learning, the agent may be used in not only a single agent method based on one agent 901 but also a multi-agent method using at least two agents 901.

In the reinforcement learning, the agent 901 may check a state 905 of the environment 902 and/or a cumulative reward 904 at regular time intervals until a time point, at which a specific problem is solved, or a given limit point, and perform the action 903 according to this. Since a result according to the action 903 does not always guarantee a positive reward, the agent 901 learns a policy for selecting the action 903 that can expect a better reward 904 through a process of exploration experiencing a large amount of trial and error.

When learning an action policy, the exploration is a very important element. Whether to find an optimal action policy is determined depending on how efficiently the exploration is performed. A scope of the exploration is roughly determined by a state space and an action space. Each of the state space and the action space may be defined as a space with discrete or continuous values depending on the problem. When either the state space or the action space has continuous values, the scope of the exploration becomes broader and the problem of learning the optimal action policy becomes complex.

Research related to the reinforcement learning may include reinforcement learning based on Q-Learning, reinforcement learning based on policy gradient, etc., but the present disclosure is not limited thereto. For example, the reinforcement learning based on Q-Learning may include deep Q-network (DQN). A Q-Learning method prior to the DQN is a method of exploring an action policy having an optimal Q-value using a Q-Table consisting of Q-values that are an expected value of the cumulative reward 904 to be received when a specific action 903 is taken in a given state 905. The DQN does not create the Q-Table and uses a method of estimating Q-values for respective actions using a deep neural network (DNN).

As another example, the reinforcement learning based on policy gradient is a method of solving a problem of a continuous action space as well as a discrete action space. Since the Q-Learning selects a discrete action 903 based on the calculated Q value, there is a disadvantage that a large change in the selected action 903 may occur even when there is a small change in the Q value. To solve this, a method has been proposed to gradually find an action policy by defining a selection probability distribution of all actions 903 for a given state 905 as a policy, quantifying a Q-function that is a performance for the selected policy, and calculating the performance change according to the policy change as a derivative. This method is referred to as reinforcement learning based on policy gradient. A study applying deep learning to the reinforcement learning based on policy gradient may include deep deterministic policy gradient (DDPG), but is not limited thereto. In the present disclosure, 'compensation' and 'reward' can be used interchangeably with each other.

In a method of generating a learning model based on reinforcement learning according to an embodiment of the present disclosure, the clothing styler may learn an artificial neural network model based on reinforcement learning based on an action policy.

In the reinforcement learning method according to an embodiment of the present disclosure, an action may be defined as a vibration width and/or a vibration speed of the moving hanger, a state may be defined as movement information of clothes and a dust amount, and a reward may be calculated based on a movement distance, a dust amount, and a reward function.

The reward function is the same as in Equation 1.

$$\text{Reward} = \alpha \cdot (\text{dust value}) + (1-\alpha) \cdot \left(\frac{1}{\text{distance}}\right) \quad \text{[Equation 1]}$$

In Equation 1, 'Reward' denotes a reward value, a denotes a proportional constant, 'dust value' denotes a dust amount, and 'distance' denotes a movement distance. That is, the reward may increase in proportion to the dust amount or increase in inverse proportion to the movement distance. The clothing styler 10 may perform training of the learning model by calculating a cumulative value of the reward and updating a parameter of the artificial neural network model so that the calculated cumulative value is maximized.

The learning model generated thus may increase the vibration speed of the moving hanger so as to increase an amount of dust generated during an control operation, and may have a parameter that minimizes the movement distance so as to minimize damage to clothes due to the increase of the vibration speed. The clothing styler 10 can implement an optimal control operation by controlling the vibration width and the vibration speed of the moving hanger using the learning model described above.

Figure 10:
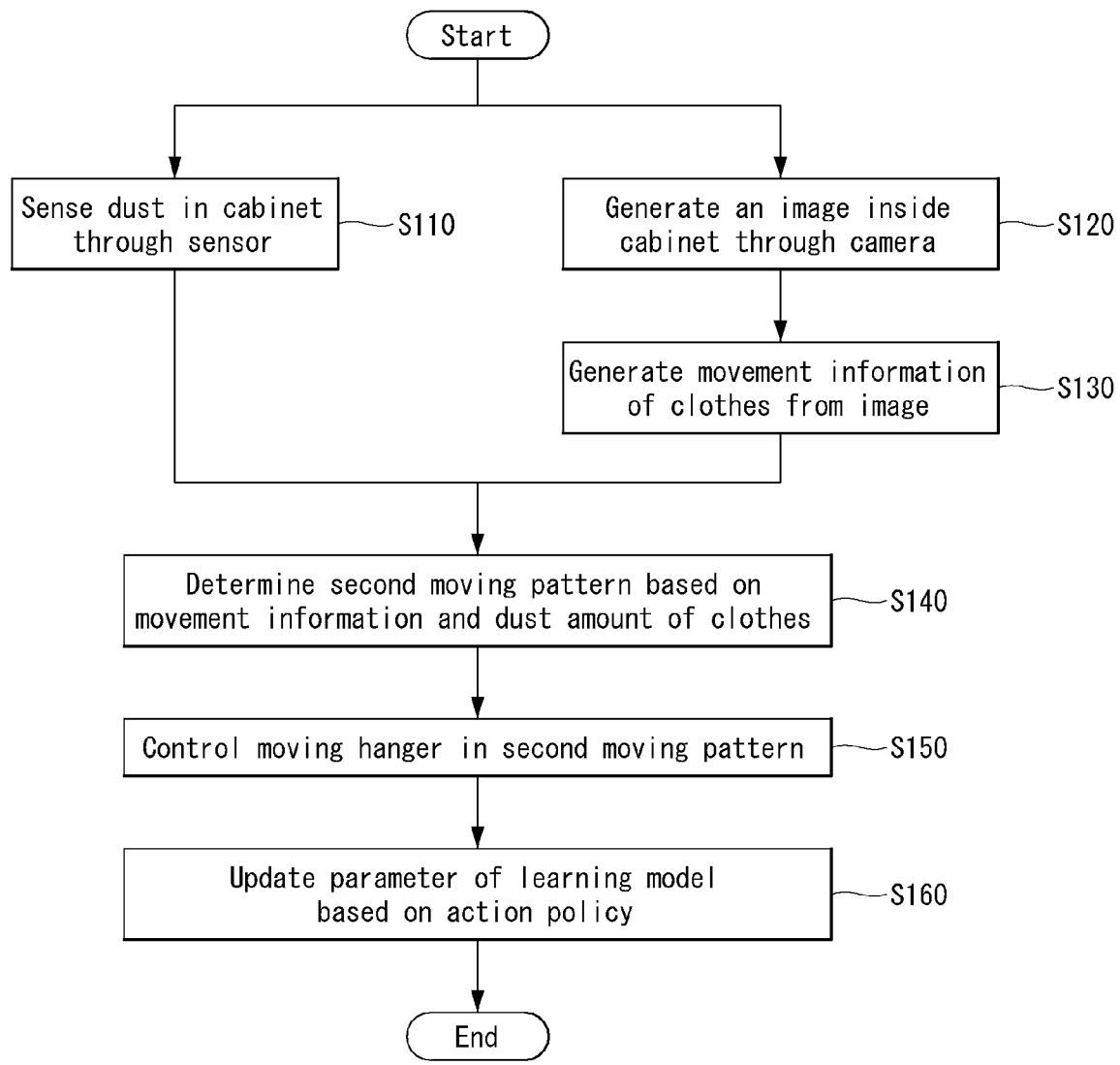
FIG. 10 is a flow chart illustrating a method of controlling a clothing styler according to an embodiment of the present disclosure.

FIG. 10 is a flow chart illustrating a method of controlling a clothing styler according to an embodiment of the present disclosure. More specifically, the inside of the processing chamber 225 descried in FIG. 10 means an inner space of the processing chamber 225.

Referring to FIG. 10, the clothing styler 10 may sense dust in the processing chamber 225 through a sensor, in S110. The sensor may include a dust sensor. The dust sensor may detect a size or an amount of dust in the processing chamber 225 and may represent the size or amount of the dust as a numerical value. The clothing styler 10 may sense dust detached from clothes while the moving hanger 260 operates in a first moving pattern.

The clothing styler 10 may generate an image of the processing chamber 225 through the camera 227, in S120. Specifically, the clothing styler 10 may generate an image of the processing chamber 225 while the moving hanger 260 operates in the first moving pattern. The moving pattern refers to a pattern moving at a specific vibration speed or a specific vibration width as an operation pattern of the moving hanger 260. The camera 227 may be positioned on a door or an inner wall of the processing chamber 225 to take clothes provided in the processing chamber 225.

The clothing styler 10 may generate movement information of the clothes from the image, in S130. The clothes may move in parallel to a vibration direction of the moving hanger 260 by a vibration of the moving hanger 260 inside the clothing styler 10 while the clothing styler 10 operates in the first moving pattern. In this case, the clothing styler 10 may compare and analyze at least one frame constituting the image to generate movement information of the clothes. The movement information may include a movement trajectory of the clothes and/or a movement distance of the clothes due to the vibration of the moving hanger 260. In this case, the movement distance of the clothes may be determined based on the movement trajectory of the clothes, and is described in detail below with reference to FIGS. 11 and 12.

The clothing styler 10 may determine a second moving pattern based on the movement information of the clothes and the dust amount, in S140. The clothing styler 10 may determine the second moving pattern through AI processing. More specifically, the clothing styler 10 may determine the second moving pattern using a learning model that is learned to generate an output for determining the vibration width or the vibration speed of the moving hanger 260 using the movement information of the clothes and the dust amount as an input. The clothing styler 10 may determine at least one of the vibration width or the vibration speed of the moving hanger 260 based on the output of the learning model. For reference, an artificial neural network includes an input layer, an output layer, and at least one hidden layer, and the input layer, the output layer, and the at least one hidden layer may include at least one node. A part of the at least one node may have different weights to produce a targeted output.

With respect to a method of determining the moving pattern, for example, the clothing styler 10 may determine at least one of the vibration width or the vibration speed of the moving hanger 260 through AI processing in a client device environment.

As another example, the clothing styler 10 may transmit the movement information of the clothes and the dust amount to the network through a transceiver, and receive an AI-processed result (i.e., information about the second moving pattern) as a response from the network. The AI-processed result may include information in which at least one of the vibration width or the vibration speed of the moving hanger 260 is determined. This is described in detail later with reference to FIG. 14.

The clothing styler 10 may control the moving hanger 260 in the second moving pattern, in S150.

The clothing styler 10 may update a parameter of the learning model based on an action policy, in S160. The learning model may be an artificial neural network model based on the reinforcement learning. When the learning model is an artificial neural network model based on the reinforcement learning, the clothing styler 10 may update a parameter of the artificial neural network model based on the reinforcement learning based on the action policy. The artificial neural network model based on the reinforcement learning may define the movement information of the clothes and the dust amount as a state and define the vibration width or the vibration speed of the moving hanger 260 as an action.

The clothing styler 10 may calculate a reward based on at least one of the movement information of the clothes or the dust amount and update a parameter of the artificial neural network model so that a cumulative value of the calculated reward is maximized. The reward may increase in proportion to the dust amount or increase in inverse proportion to the movement distance. Further, the reward may increase in proportion to the dust amount and increase in inverse proportion to the movement distance.

The clothing styler 10 may determine the second moving pattern having the optimal vibration width or vibration speed using the learning model in which the parameter has been updated, and may control the moving hanger 260 based on the determined second moving pattern.

As above, the clothing styler 10 may determine an appropriate moving pattern of the moving hanger 260 based on movement information generated according to material, weight, length, etc. of clothes and an amount of dust sensed. For example, if clothes are long or wide, the moving hanger 260 can more efficiently remove dust and wrinkles by controlling a vibration width swinging from side to side to be wide rather than simply shaking the clothes quickly from side to side. As another example, if clothes are heavy due to a material of the clothes, damage and deterioration of the clothes may occur due to a vibration of the moving hanger 260. Therefore, there is a need to control the vibration at an appropriate speed.

The clothing styler 10 according to an embodiment of the present disclosure can reduce unnecessary energy consumption and increase energy efficiency by controlling the moving hanger 260 so that at least one of the vibration width or the vibration speed of the moving hanger 260 is determined based on movement information.

The clothing styler 10 can control the operation of the moving hanger 260 so that an effect of removing dust and/or wrinkles is minimized while minimizing damage and/or deterioration of the clothes due to a vibration of the moving hanger 260.

Figure 11:
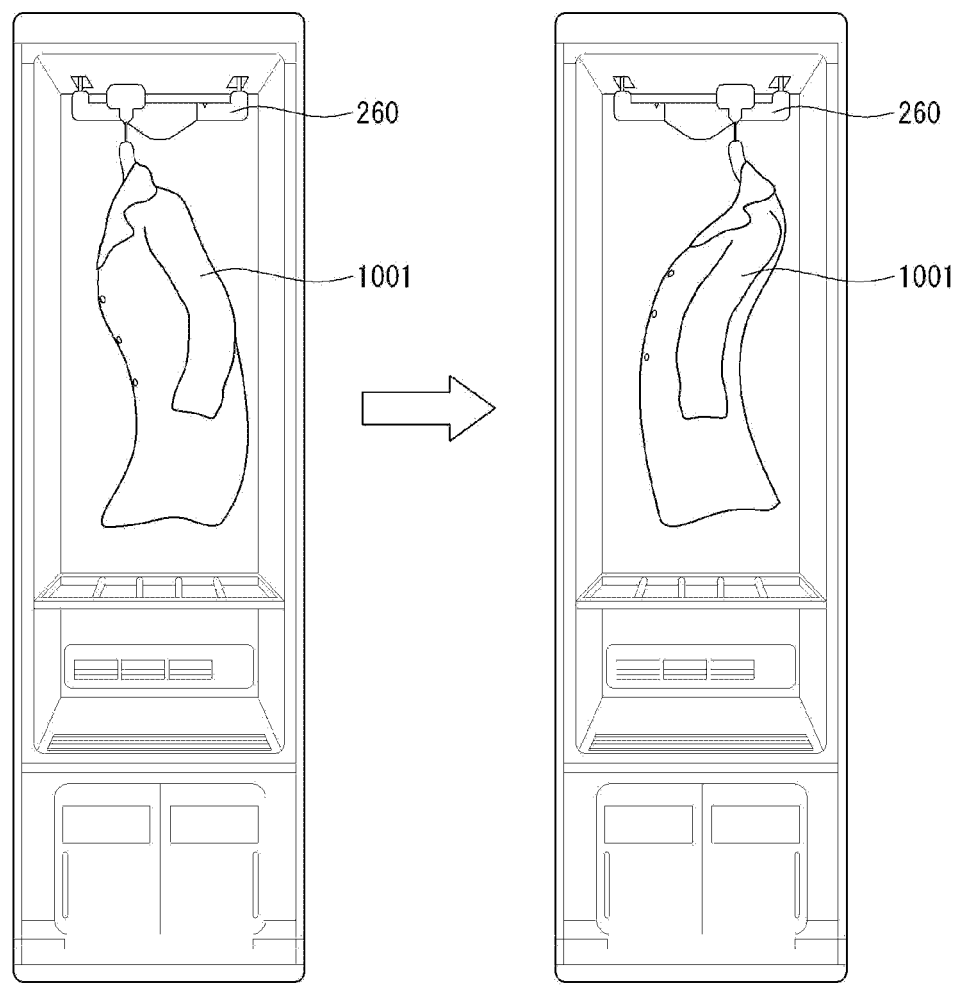
FIGS. 11 and 12 illustrate S130 of FIG. 10.
Figure 12:
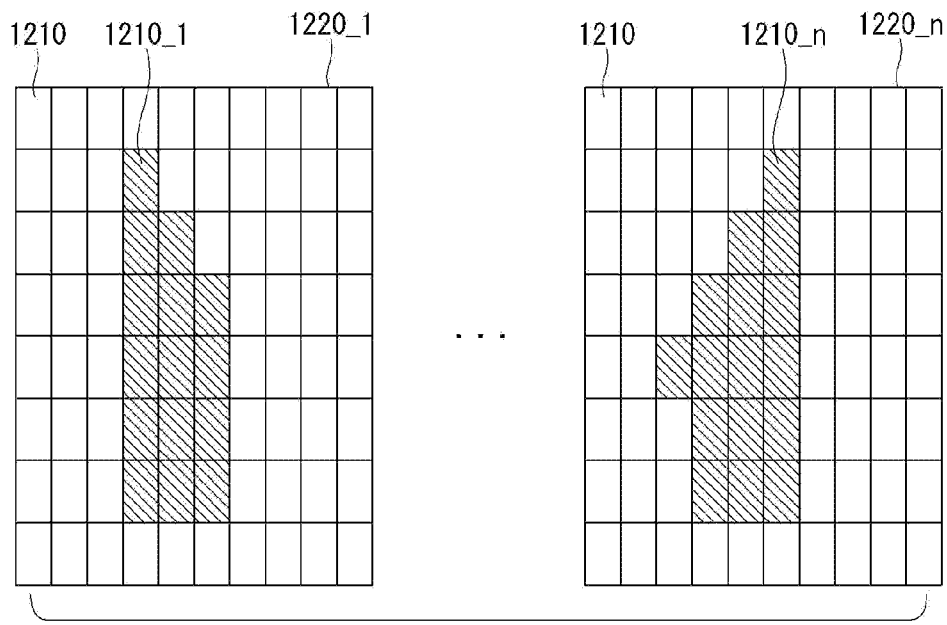
Figure 12:
Figure 12:
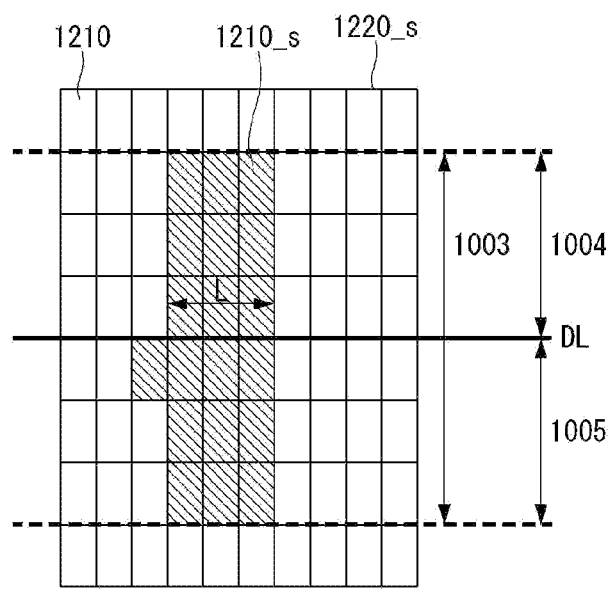

FIGS. 11 and 12 illustrate S130 of FIG. 10.

As described above, movement information of clothes may include a movement distance of the clothes due to a vibration of the moving hanger 260. The clothing styler 10 may generate an image based on image information obtained through a camera, partition each frame included in the generated image into a plurality of blocks, and determine at least two blocks of the plurality of partitioned blocks, in which the frequency of change in display information is equal to or greater than a preset threshold.

The clothing styler 10 may connect the determined at least two blocks with a line of one direction and determine a movement distance of the clothes from a length of the connected line. For example, the line of one direction is a result of connecting at least two blocks in one direction, and may be expressed as a curved line, a straight line, a bent connecting line, or the like.

The clothing styler 10 according to an embodiment of the present disclosure may divide a frame of the image into at least one area without identifying an overall movement trajectory of the clothes, and detect the movement distance of the clothes based on a dividing boundary line of the at least one area.

Referring to FIG. 11, the clothing styler 10 may generate an image of a clothes 1001 provided in the processing chamber through the camera. The clothing styler 10 may photograph the clothes 1001 fluttering according to a vibrating motion of the moving hanger 260 in the processing chamber through the camera.

Referring to FIG. 11, the clothing styler 10 may analyze at least one frame (1220_1, . . . , 1220_n) of the photographed image. The clothing styler 10 may analyze at least one frame (1220_1, . . . , 1220_n) to generate movement trajectory information. The clothing styler 10 may partition each of at least one frame (1220_1, . . . , 1220_n) into a plurality of blocks 1210 so as to generate the movement trajectory information. In this instance, the clothing styler 10 may monitor changes in display information (1210_1, . . . , 1210_n) of the plurality of blocks 1210 and determine at least two blocks 1210_s of the plurality of blocks 1210, in which the frequency of change in the display information is equal to or greater than a preset threshold.

For example, the image may include first to nth frames (where n is a natural number) and may be partitioned into the plurality of blocks 1210 by a processor of the clothing styler 10. In this instance, the plurality of blocks 1210 may include a blank block in which the clothes 1001 is not sensed and sensing blocks 1210_1, . . . , 1210_n in which the clothing 1001 is sensed. The clothing styler 10 may record, in a memory, the frequency of change in display information of the plurality of blocks 1210 by monitoring change in display information of the sensing blocks 1210_1, . . . , 1210_n. As a result, the clothing styler 10 may determine the blocks 1210_s of the plurality of blocks 1210, in which the frequency of change in the display information is equal to or greater than a preset threshold. This may indicate a target block 1210_s in (b) of FIG. 12. The target block 1210_s refers to a block that is a target for determining a movement trajectory and a movement distance L.

When the target block 1210_s is determined, the clothing styler 10 may determine a reference line DL for measuring the length and may determine the movement distance L of the clothes 1001 from the number of target blocks 1210_s overlapping the reference line DL. For example, in FIG. 12, the number of target blocks 1210_s overlapping the reference line DL is three, and the movement distance of the clothes 1001 is determined as L corresponding to the length of the three target blocks based on length information of a predetermined block.

In this instance, length information of the target block 1210_s may include horizontal length information and vertical length information 1003. When the movement distance is determined, the clothing styler 10 may determine the movement distance L of the clothes 1001 using length information of a direction closer to a direction of the reference line DL. For example, since the direction of the reference line DL is a horizontal direction in FIG. 12, the clothing styler 10 determines the movement distance L based on the horizontal length information of the target block.

The clothing styler 10 according to an embodiment of the present disclosure may determine the movement distance L of the clothes 1001 by dividing the movement trajectory according to the movement of the clothes 1001 into two or more areas and sensing the target blocks 1210_s overlapping the reference line DL dividing the two or more areas. For example, as illustrated in FIG. 12, the clothing styler 10 may divide an area 1003, in which the target block 1210_s is sensed, into a first area 1004 and a second area 1005 and determine the movement distance L of the clothes 1001 using the reference line DL.

Figure 13:
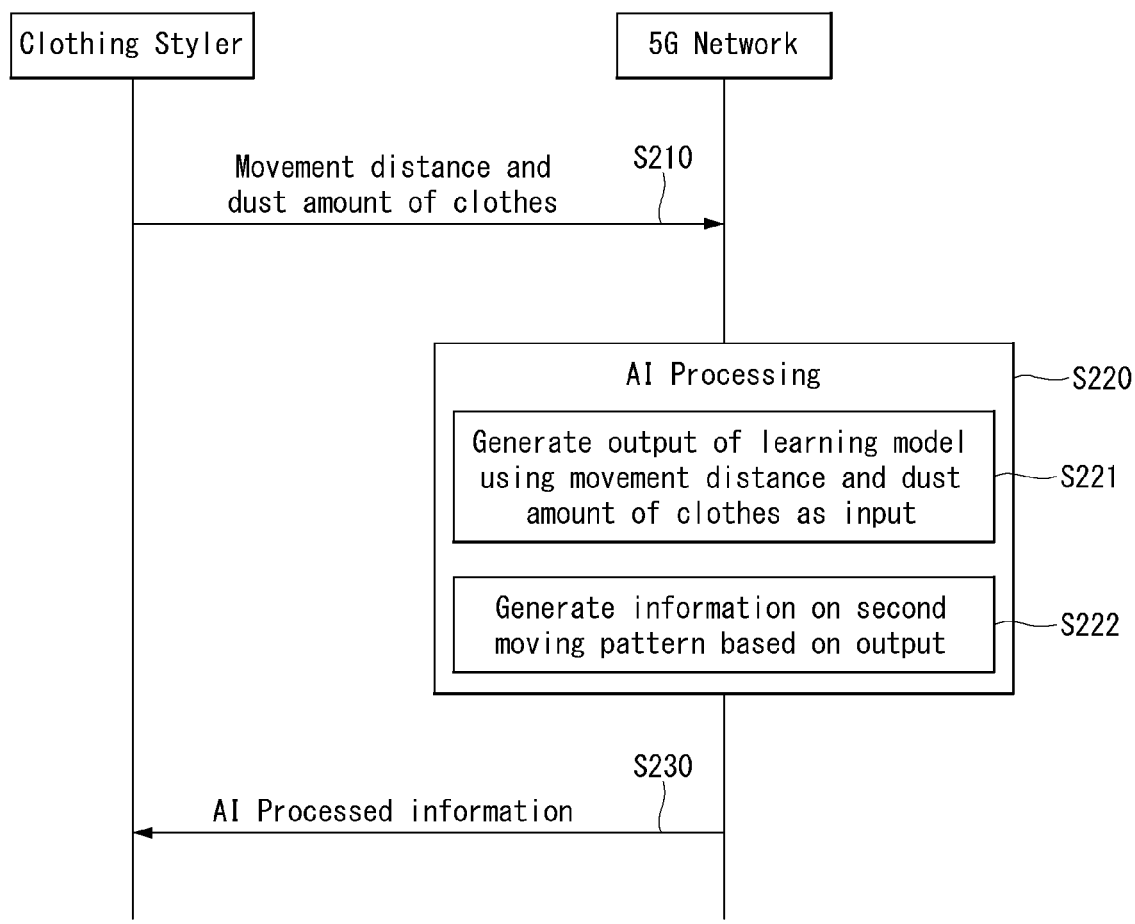
FIG. 13 is a sequence diagram illustrating a method of controlling a clothing styler according to another embodiment of the present disclosure.

FIG. 13 is a sequence diagram illustrating a method of controlling a clothing styler according to another embodiment of the present disclosure. FIG. 10 described the method of controlling the clothing styler on the assumption of AI processing in a client device environment, and FIG. 13 describes a method of controlling a clothing styler on the assumption of AI processing based on communication with a network.

A clothing styler 10 may control a transceiver to transmit a movement distance of clothes and a dust amount to an AI processor included in a network. The clothing styler 10 may control the transceiver to receive AI-processed information from the AI processor.

The clothing styler 10 may perform an initial access procedure with the network so as to transmit the movement distance of the clothes and the dust amount to the network. The clothing styler 10 may perform the initial access procedure with the network based on a synchronization signal block (SSB).

The clothing styler 10 may transmit the movement distance of the clothes and the dust amount to the network through the transceiver. The clothing styler 10 may transmit the movement distance of the clothes and the dust amount to the network based on downlink control information (DCI).

The movement distance of the clothes and the dust amount may be transmitted to the network via a physical uplink shared channel (PUSCH), and the SSB and a dedicated demodulation reference signal (DM-RS) of the PUSCH may be QCLed with respect to quasi-co location (QCL) type D.

Referring to FIG. 13, the clothing styler 10 may transmit the movement distance of the clothes and the dust amount to 5G network through the transceiver, in S210.

The 5G network may include an AI processor or an AI system. The AI system of the 5G network may perform AI processing based on the received movement distance of the clothes and dust amount, in S220.

The AI system may generate an output of a learning model using the movement distance of the clothes and the dust amount received from the clothing styler 10 as an input, in S221.

The AI system may generate information on a second moving pattern including at least one of a vibration speed and/or a vibration width based on the output and may transmit the information to the clothing styler 10, in S222 and S230.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

The invention claimed is:

1. A method of controlling a clothing styler, the method comprising:
sensing a dust amount in a processing chamber through a sensor while a moving hanger operates in a first moving pattern;
generating movement information of clothes provided in the processing chamber through a camera while the moving hanger operates in the first moving pattern;
determining a second moving pattern based on the movement information of the clothes and the dust amount; and
controlling the moving hanger based on the determined second moving pattern,
wherein the second moving pattern is determined based on a learning model that is learned to generate an output for determining a vibration width or a vibration speed of the moving hanger using the movement information and the dust amount as an input,
wherein the learning model is an artificial neural network model based on reinforcement learning,
wherein the artificial neural network model based on reinforcement learning calculates a reward based on at least one of the movement information of the clothes or the dust amount, and
wherein the reward is calculated to increase in inverse proportion to a movement distance of the clothes due to a vibration of the moving hanger.

2. The method of claim 1, wherein the movement information includes the movement distance of the clothes due to the vibration of the moving hanger.

3. The method of claim 1, wherein the artificial neural network model based on reinforcement learning defines the movement information of the clothes and the dust amount as a state.

4. The method of claim 1, wherein the artificial neural network model based on reinforcement learning defines the vibration width or the vibration speed of the moving hanger as an action.

5. The method of claim 1, wherein the reward is calculated to increase in proportion to the dust amount.

6. The method of claim 1, wherein the reward is calculated to increase in inverse proportion to the movement distance while increasing in proportion to the dust amount.

7. The method of claim 1, wherein determining the second moving pattern further comprises receiving, from a network, downlink control information (DCI) that is used to schedule a transmission of the movement information of the clothes and the dust amount, and
wherein the movement information of the clothes and the dust amount are transmitted to the network based on the DCI.

8. The method of claim 7, further comprising:
performing an initial access procedure with the network based on a synchronization signal block (SSB),
wherein the movement information of the clothes and the dust amount are transmitted to the network via a physical uplink shared channel (PUSCH), and
wherein the SSB and a dedicated demodulation reference signal (DM-RS) of the PUSCH are QCLed with respect to quasi-co location (QCL) type D.

9. A clothing styler comprising:
a sensor configured to sense a dust amount in a processing chamber while a moving hanger operates in a first moving pattern;
a camera configured to take an image inside the processing chamber while the moving hanger operates in the first moving pattern; and
a processor configured to:
sense the dust amount in the processing chamber through the sensor while the moving hanger operates in the first moving pattern, generate movement information of clothes provided in the processing chamber based on the image captured by the camera while the moving hanger operates in the first moving pattern, determine a second moving pattern based on the movement information of the clothes and the dust amount, and control the moving hanger based on the determined second moving pattern, wherein the second moving pattern is determined based on a learning model that is learned to generate an output for determining a vibration width or a vibration speed of the moving hanger using the movement information and the dust amount as an input, wherein the learning model is an artificial neural network model based on reinforcement learning, wherein the artificial neural network model based on reinforcement learning calculates a reward based on at least one of the movement information of the clothes or the dust amount, and wherein the reward is calculated to increase in inverse proportion to a movement distance of the clothes due to a vibration of the moving hanger.

10. The clothing styler of claim 9, further comprising:

a transceiver, wherein the processor is further configured to transmit the movement information of the clothes and the dust amount to a network through the transceiver and receive information on the second moving pattern as a response from the network.

11. A computer readable recording medium in which a program performing the method according to claim 1 is recorded.

* * * * *